US007687013B2

(12) United States Patent
Kawai et al.

(10) Patent No.: US 7,687,013 B2

(45) Date of Patent: Mar. 30, 2010

(54) METHOD FOR FIRING CERAMIC MOLDED BODY AND METHOD FOR MANUFACTURING HONEYCOMB STRUCTURE

(75) Inventors: Tsuyoshi Kawai, Ibi-gun (JP); Takamitsu Saijo, Dunavarsany (HU); Kenichiro Kasai, Ibi-gun (JP)

(73) Assignee: Ibiden Co., Ltd., Ogaki-shi (JP)

( * ) Notice: Subject to any disclaimer, the term of this patent is extended or adjusted under 35 U.S.C. 154(b) by 0 days.

(21) Appl. No.: 11/927,046

(22) Filed: Oct. 29, 2007

(65) Prior Publication Data

US 2008/0157445 A1 Jul. 3, 2008

Related U.S. Application Data

(63) Continuation of application No. PCT/JP2006/309117, filed on May 1, 2006.

(51) Int. Cl.
*C04B 33/32* (2006.01)

(52) U.S. Cl. ........................ 264/605; 264/607; 264/630

(58) Field of Classification Search ................. 264/605, 264/630, 631, 607
See application file for complete search history.

(56) References Cited

U.S. PATENT DOCUMENTS

| | | | | |
|---|---|---|---|---|
| 1,709,733 | A * | 4/1929 | Mitchell | 198/780 |
| 4,627,785 | A * | 12/1986 | Monforte | 414/730 |
| 4,778,383 | A | 10/1988 | Strobel et al. | |
| 5,035,597 | A * | 7/1991 | Tanaka et al. | 425/135 |
| 5,507,085 | A | 4/1996 | Easton et al. | |
| 5,567,366 | A * | 10/1996 | Motegi et al. | 264/39 |
| 5,914,187 | A | 6/1999 | Naruse et al. | |
| 6,165,936 | A * | 12/2000 | Yamada et al. | 502/439 |
| 6,669,751 | B1 | 12/2003 | Ohno et al. | |
| 7,112,233 | B2 | 9/2006 | Ohno et al. | |
| 7,309,370 | B2 | 12/2007 | Kudo et al. | |
| 7,332,014 | B2 | 2/2008 | Ono et al. | |
| 7,341,614 | B2 | 3/2008 | Hayashi et al. | |
| 7,348,049 | B2 | 3/2008 | Yoshida | |
| 7,387,829 | B2 | 6/2008 | Ohno et al. | |
| 7,393,376 | B2 | 7/2008 | Taoka et al. | |

(Continued)

FOREIGN PATENT DOCUMENTS

DE 3425165 A1 * 1/1986

(Continued)

*Primary Examiner*—Steven P Griffin
*Assistant Examiner*—Erin Snelting
(74) *Attorney, Agent, or Firm*—Ditthavong Mori & Steiner, P.C.

(57) ABSTRACT

A circulating apparatus includes a firing jig assembling apparatus, a firing furnace, a firing jig disassembling apparatus, and a transporting conveyor. The firing jig assembling apparatus includes a lid member attaching mechanism that attaches the lid member to a predetermined position of the firing jig placed on the table or the conveyor; and a jig delivering mechanism that delivers the firing jig which has the ceramic molded body being mounted thereon and the lid member being attached thereto, to the firing furnace. The firing jig disassembling apparatus further includes a jig receiving mechanism that receives the firing jig which has the fired ceramic molded body being mounted thereon and the lid member being attached thereto, from the firing furnace; and a lid member detaching mechanism that detaches the lid member from the firing jig placed on the table or the conveyor with the lid member being attached thereto.

40 Claims, 13 Drawing Sheets

U.S. PATENT DOCUMENTS

| | | | | |
|---|---|---|---|---|
| 7,396,586 | B2 | 7/2008 | Ohno et al. | |
| 7,427,308 | B2 | 9/2008 | Taoka et al. | |
| 7,427,309 | B2 | 9/2008 | Ohno et al. | |
| 7,438,967 | B2 | 10/2008 | Fujita | |
| 7,449,427 | B2 | 11/2008 | Ohno et al. | |
| 7,462,216 | B2 | 12/2008 | Kunieda et al. | |
| 7,473,465 | B2 | 1/2009 | Ohno et al. | |
| 2004/0161596 | A1 | 8/2004 | Taoka et al. | |
| 2005/0109023 | A1 | 5/2005 | Kudo et al. | |
| 2005/0153099 | A1 | 7/2005 | Yamada | |
| 2005/0169819 | A1 | 8/2005 | Shibata | |
| 2005/0175514 | A1 | 8/2005 | Ohno | |
| 2005/0180898 | A1 | 8/2005 | Yamada | |
| 2005/0247038 | A1 | 11/2005 | Takahashi | |
| 2005/0272602 | A1 | 12/2005 | Ninomiya | |
| 2006/0029897 | A1 | 2/2006 | Saijo et al. | |
| 2006/0029898 | A1 | 2/2006 | Saijo et al. | |
| 2006/0043652 | A1 | 3/2006 | Saijo et al. | |
| 2006/0051556 | A1 | 3/2006 | Ohno et al. | |
| 2006/0073970 | A1 | 4/2006 | Yamada | |
| 2006/0108347 | A1 | 5/2006 | Koyama et al. | |
| 2006/0118546 | A1 | 6/2006 | Saijo | |
| 2006/0166820 | A1 | 7/2006 | Ogyu et al. | |
| 2006/0210765 | A1 | 9/2006 | Ohno et al. | |
| 2006/0216466 | A1 | 9/2006 | Yoshida | |
| 2006/0216467 | A1 | 9/2006 | Yoshida | |
| 2006/0222812 | A1 | 10/2006 | Koyama et al. | |
| 2006/0225390 | A1 | 10/2006 | Yoshida | |
| 2006/0230732 | A1 | 10/2006 | Kunieda | |
| 2006/0245465 | A1 | 11/2006 | Saijo et al. | |
| 2006/0269722 | A1 | 11/2006 | Yamada | |
| 2006/0283039 | A1 | 12/2006 | Ishii et al. | |
| 2007/0001349 | A1* | 1/2007 | Muroi et al. ................ | 264/605 |
| 2007/0020155 | A1 | 1/2007 | Ohno et al. | |
| 2007/0028575 | A1 | 2/2007 | Ohno et al. | |
| 2007/0044444 | A1 | 3/2007 | Oshimi | |
| 2007/0068128 | A1 | 3/2007 | Oshimi et al. | |
| 2007/0085233 | A1 | 4/2007 | Yamada | |
| 2007/0116908 | A1 | 5/2007 | Ohno et al. | |
| 2007/0126160 | A1 | 6/2007 | Takahashi | |
| 2007/0128405 | A1 | 6/2007 | Sakaguchi et al. | |
| 2007/0130897 | A1 | 6/2007 | Sakaguchi et al. | |
| 2007/0144561 | A1 | 6/2007 | Saijo et al. | |
| 2007/0148403 | A1 | 6/2007 | Yamamura et al. | |
| 2007/0152382 | A1 | 7/2007 | Yamada et al. | |
| 2007/0169453 | A1 | 7/2007 | Hayakawa | |
| 2007/0175060 | A1 | 8/2007 | Idei et al. | |
| 2007/0178275 | A1 | 8/2007 | Takahashi | |
| 2007/0187651 | A1 | 8/2007 | Naruse et al. | |
| 2007/0190350 | A1 | 8/2007 | Ohno et al. | |
| 2007/0196620 | A1 | 8/2007 | Ohno et al. | |
| 2007/0199205 | A1 | 8/2007 | Hoshino et al. | |
| 2007/0199643 | A1 | 8/2007 | Kawai et al. | |
| 2007/0202455 | A1 | 8/2007 | Saijo et al. | |
| 2007/0204580 | A1 | 9/2007 | Kunieda | |
| 2007/0212517 | A1 | 9/2007 | Ohno et al. | |
| 2007/0235895 | A1 | 10/2007 | Yamamura et al. | |
| 2007/0243283 | A1 | 10/2007 | Yamamura et al. | |
| 2007/0262497 | A1 | 11/2007 | Yamamura et al. | |
| 2007/0262498 | A1 | 11/2007 | Saijo et al. | |
| 2007/0277655 | A1 | 12/2007 | Kawai et al. | |
| 2007/0293392 | A1 | 12/2007 | Ohno et al. | |
| 2008/0006971 | A1 | 1/2008 | Kawai et al. | |
| 2008/0067725 | A1 | 3/2008 | Naruse et al. | |
| 2008/0084010 | A1 | 4/2008 | Naruse et al. | |
| 2008/0088072 | A1 | 4/2008 | Kobayashi | |
| 2008/0106008 | A1 | 5/2008 | Kasai et al. | |
| 2008/0106009 | A1 | 5/2008 | Naruse et al. | |
| 2008/0116200 | A1 | 5/2008 | Kawai et al. | |
| 2008/0120950 | A1 | 5/2008 | Ohno et al. | |
| 2008/0136053 | A1 | 6/2008 | Kuribayashi et al. | |
| 2008/0136062 | A1 | 6/2008 | Kasai et al. | |
| 2008/0138567 | A1 | 6/2008 | Ninomiya et al. | |
| 2008/0174039 | A1 | 7/2008 | Saijo et al. | |
| 2008/0190081 | A1 | 8/2008 | Oshimi | |
| 2008/0190083 | A1 | 8/2008 | Oshimi | |
| 2008/0197544 | A1 | 8/2008 | Saijo et al. | |
| 2008/0213485 | A1 | 9/2008 | Shibata | |
| 2008/0236115 | A1 | 10/2008 | Sakashita | |
| 2008/0236122 | A1 | 10/2008 | Ito | |
| 2008/0236724 | A1 | 10/2008 | Higuchi | |
| 2008/0237942 | A1 | 10/2008 | Takamatsu | |
| 2008/0241015 | A1 | 10/2008 | Kudo et al. | |
| 2008/0241444 | A1 | 10/2008 | Oshimi | |
| 2008/0241466 | A1 | 10/2008 | Saito et al. | |
| 2008/0284067 | A1 | 11/2008 | Naruse et al. | |
| 2008/0305259 | A1 | 12/2008 | Saijo | |
| 2008/0318001 | A1 | 12/2008 | Sakakibara | |
| 2009/0004431 | A1 | 1/2009 | Ninomiya | |
| 2009/0107879 | A1 | 4/2009 | Otsuka et al. | |
| 2009/0130378 | A1 | 5/2009 | Imaeda et al. | |

FOREIGN PATENT DOCUMENTS

| | | |
|---|---|---|
| JP | 61-280385 | 12/1986 |
| JP | 08-188472 | 7/1996 |
| JP | 2001-207211 | 7/2001 |
| WO | WO 2005/014207 | 2/2005 |
| WO | WO 2005/024326 | 3/2005 |

* cited by examiner

A-A line cross-sectional view

METHOD FOR FIRING CERAMIC MOLDED BODY AND METHOD FOR MANUFACTURING HONEYCOMB STRUCTURE

CROSS-REFERENCE TO RELATED APPLICATIONS

This application is a continuation application of PCT/JP2006/309117 filed on May 1, 2006. The contents of this application are incorporated herein by reference in their entirety.

BACKGROUND OF THE INVENTION

1. Field of the Invention

The present invention relates to a firing jig assembling apparatus, a firing jig disassembling apparatus, a circulating apparatus, a method for firing a ceramic molded body, and a method for manufacturing a honeycomb structure.

2. Discussion of the Background

In recent years, particulates such as soot contained in exhaust gases that are discharged from internal combustion engines of vehicles, such as buses and trucks, and construction machines, have raised serious problems as contaminants harmful to the environment and the human body.

Various honeycomb filters using honeycomb structural bodies as filters that collect particulates in exhaust gases to purify the exhaust gases have been proposed.

Conventionally, upon manufacturing a honeycomb structure, first, a wet mixture is prepared by mixing ceramic powder, a binder and a dispersant solution or the like with one another. Moreover, the wet mixture is continuously extrusion-molded through a die, and the extrusion-molded body is cut into a predetermined length so that a pillar-shaped honeycomb molded body is manufactured.

Next, the resulting honeycomb molded body is dried by using a microwave dryer or a hot-air dryer.

Thereafter, the end portions of this honeycomb molded body are plugged by a plug material paste mainly composed of the ceramic powder into a diced pattern, and then respective degreasing and firing processes are carried out so that a honeycomb fired body is manufactured.

Thereafter, a sealing material paste is applied to the side faces of the honeycomb fired body, and the honeycomb fired bodies are mutually bonded by using an adhesive so that an aggregate of the honeycomb fired bodies in which a number of the honeycomb fired bodies are bound to one another through the sealing material layers (adhesive layers) is manufactured. Next, the resulting aggregate of the honeycomb fired bodies is cut and machined into a predetermined shape, such as a cylindrical shape and an cylindroid shape, by using a cutting machine or the like so that a honeycomb block is formed. Lastly, a sealing material paste is applied onto the periphery of the honeycomb block to form a sealing material layer (coat layer); thus, the manufacturing of the honeycomb structure is completed.

In such a method for manufacturing a honeycomb structure, the firing process is normally carried out on a honeycomb molded body that is mounted on a firing jig, with a lid member being attached to the firing jig. Here, these firing jig and lid member are normally used repeatedly.

For example, WO 2005/024326 A1 has disclosed a method for circulating a receiving base on which the honeycomb molded body is placed so as to use the receiving base repeatedly.

The contents of WO 2005/024326 A1 are incorporated herein by reference in their entirety.

SUMMARY OF THE INVENTION

The firing jig assembling apparatus in accordance with the present invention includes a robot arm; and a table or a conveyor for placing a firing jig thereon with a ceramic molded body being mounted on the firing jig upon firing the ceramic molded body, a lid member being attached to the firing jig that mounts the ceramic molded body thereon on the table or the conveyor. The firing jig assembling apparatus further includes a lid member attaching mechanism that attaches the lid member by using the robot arm to a predetermined position of the firing jig placed on the table or the conveyor.

The above-mentioned firing jig assembling apparatus in accordance with the present invention desirably includes a jig piling mechanism that piles up a plurality of the firing jigs, each having the ceramic molded body mounted thereon, in multiple stages.

Moreover, the firing jig assembling apparatus in accordance with the present invention desirably includes a bottom member and a sidewall member.

In the firing jig assembling apparatus in accordance with the present invention, desirably, the conveyor moves intermittently, and upon stopping of the conveyor, the conveyor shifts from a moving state at a moving speed of about 1.5 m/min or less to a stopped state.

The firing jig disassembling apparatus in accordance with the present invention includes a robot arm; and a table or a conveyor for placing thereon a firing jig to which a lid member is attached, with a ceramic molded body being mounted on the firing jig upon firing the ceramic molded body, the lid member attached to the firing jig being detached on the table or the conveyor. The firing jig disassembling apparatus further includes a lid member detaching mechanism that detaches the lid member by using the robot arm from the firing jig placed on the table or the conveyor with the lid member being attached thereto.

The firing jig disassembling apparatus in accordance with the present invention desirably includes a jig taking-out mechanism that takes out one firing jig from the firing jigs piled up in multiple stages.

Moreover, in the firing jig disassembling apparatus in accordance with the present invention, firing jig desirably comprises a bottom member and a sidewall member.

In the firing jig disassembling apparatus in accordance with the present invention, desirably, the conveyor moves intermittently, and upon stopping of the conveyor, the conveyor shifts from a moving state at a moving speed of about 1.5 m/min or less to a stopped state.

The circulating apparatus in accordance with the present invention includes a firing jig assembling apparatus which includes a robot arm, and a table or a conveyor for placing a firing jig thereon with a ceramic molded body being mounted on the firing jig upon firing the ceramic molded body, a lid member being attached to the firing jig that mounts the ceramic molded body thereon on the table or the conveyor; a firing furnace used for firing the ceramic molded body mounted on the firing jig; a firing jig disassembling apparatus which includes a robot arm, and a table or a conveyor for placing thereon a firing jig to which a lid member is attached, with a ceramic molded body being mounted on the firing jig upon firing the ceramic molded body, the lid member attached to the firing jig being detached on the table or the conveyor; and a transporting conveyor that transports at least either one of the lid member that is detached in the firing jig disassembling apparatus and the firing jig to the firing jig assembling apparatus.

The firing jig assembling apparatus of the circulating apparatus includes a lid member attaching mechanism that attaches the lid member by using the robot arm to a predetermined position of the firing jig placed on the table or the conveyor; and a jig delivering mechanism that delivers the firing jig which has the ceramic molded body being mounted thereon and the lid member being attached thereto, to the firing furnace.

The firing jig disassembling apparatus of the circulating apparatus further includes a jig receiving mechanism that receives the firing jig which has the fired ceramic molded body being mounted thereon and the lid member being attached thereto, from the firing furnace; and a lid member detaching mechanism that detaches the lid member by using the robot arm from the firing jig placed on the table or the conveyor with the lid member being attached thereto.

In the circulating apparatus in accordance with the present invention, desirably, the firing jig assembling apparatus further includes a jig piling mechanism that piles up a plurality of the firing jigs, each having the ceramic molded body mounted thereon, in multiple stages. The firing jig disassembling apparatus further includes a jig taking-out mechanism that takes out a firing jig from the firing jigs piled up in multiple stages.

In the circulating apparatus in accordance with the present invention, the firing jig is desirably comprised of a bottom member and a sidewall member.

Moreover, the bottom member is desirably usable as a degreasing jig.

In the above-mentioned circulating apparatus in accordance with the present invention, the filing jig assembling apparatus and/or the firing jig disassembling apparatus include the conveyor that moves intermittently, and upon stopping of the conveyor, the conveyor shifts from a moving state at a moving speed of about 1.5 m/min or less to a stopped state.

The method for firing a ceramic molded body in accordance with the present invention includes mounting a ceramic molded body on a firing jig; and firing the ceramic molded body by allowing the firing jig which has the ceramic molded body being mounted thereon to pass through the inside of a firing furnace. These steps are conducted by using a circulating apparatus that includes a firing jig assembling apparatus which includes a robot arm, and a table or a conveyor for placing the firing jig thereon with the ceramic molded body being mounted on the firing jig upon firing the ceramic molded body, a lid member being attached to the firing jig that mounts the ceramic molded body thereon on the table or the conveyor; the firing furnace used for firing the ceramic molded body mounted on the firing jig; a firing jig disassembling apparatus which includes a robot arm, and a table or a conveyor for placing thereon a firing jig to which a lid member is attached, with a ceramic molded body being mounted on the firing jig upon firing the ceramic molded body, the lid member attached to the firing jig being detached on the table or the conveyor; and a transporting conveyor that transports at least either one of the lid member that is detached in the firing jig disassembling apparatus and the firing jig to the firing jig assembling apparatus.

The firing jig assembling apparatus which is used in the method includes a lid member attaching mechanism that attaches the lid member by using the robot arm to a predetermined position of the firing jig placed on the table or the conveyor; and a jig delivering mechanism that delivers the firing jig which has the ceramic molded body being mounted thereon and the lid member being attached thereto, to the firing furnace.

The firing jig disassembling apparatus which is used in the method further includes a jig receiving mechanism that receives the firing jig which has the fired ceramic molded body being mounted thereon with the lid member being attached thereto, from the firing furnace; and a lid member detaching mechanism that detaches the lid member by using the robot arm from the firing jig placed on the table or the conveyor with the lid member being attached thereto.

In the above-mentioned method for firing the ceramic molded body in accordance with the present invention, desirably, the firing jig assembling apparatus further includes a jig piling mechanism that piles up a plurality of the firing jigs, each having the ceramic molded body mounted thereon, in multiple stages, and the firing jig disassembling apparatus further includes a jig taking-out mechanism that takes out a firing jig from the firing jigs piled up in multiple stages.

In the method for firing the ceramic molded body in accordance with the present invention, the firing jig is comprised of a bottom member and a sidewall member.

Further, desirably, the bottom member is usable as a degreasing jig.

In the above-mentioned method for firing a ceramic molded body in accordance with the present invention, the firing jig assembling apparatus and/or the firing jig disassembling apparatus includes the conveyor that moves intermittently, and upon stopping of the conveyor, the conveyor shifts from a moving state at a moving speed of about 1.5 m/min or less to a stopped state.

The method for manufacturing a honeycomb structure in accordance with the present invention includes manufacturing a pillar-shaped honeycomb molded body having a large number of cells longitudinally placed in parallel with one another with a cell wall therebetween by molding a ceramic material; mounting the honeycomb molded body onto a firing jig; and firing the honeycomb molded body mounted on the firing jig.

The step of firing of the honeycomb molded body is carried out by using a circulating apparatus that includes a firing jig assembling apparatus which includes a robot arm, and a table or a conveyor for placing the firing jig thereon with the honeycomb molded body being mounted on the firing jig upon firing the honeycomb molded body, a lid member being attached to the firing jig that mounts the honeycomb molded body thereon on the table or the conveyor; a firing furnace used for firing the honeycomb molded body mounted on the firing jig; a firing jig disassembling apparatus which includes a robot arm, and a table or a conveyor for placing thereon a firing jig to which a lid member is attached, with a honeycomb molded body being mounted on the firing jig upon firing the honeycomb molded body, the lid member attached to the firing jig being detached on the table or the conveyor; and a transporting conveyor that transports at least either one of the lid member that is detached in the firing jig disassembling apparatus and the firing jig to the firing jig assembling apparatus.

The firing jig assembling apparatus which is used in the method includes a lid member attaching mechanism that attaches the lid member by using the robot arm to a predetermined position of the firing jig placed on the table or the conveyor; and a jig delivering mechanism that delivers the firing jig which has the honeycomb molded body being mounted thereon and the lid member being attached thereto, to the firing furnace. The firing jig disassembling apparatus which is used in the method further includes a jig receiving mechanism that receives the firing jig which has the fired honeycomb molded body being mounted thereon with the lid member being attached thereto, from the firing furnace; and a lid member detaching mechanism that detaches the lid member by using the robot arm from the firing jig placed on the table or the conveyor with the lid member being attached thereto.

In the above-mentioned method for manufacturing a honeycomb structure in accordance with the present invention, desirably, the firing jig assembling apparatus further includes a jig piling mechanism that piles up a plurality of the firing jigs, each having the honeycomb molded body mounted thereon, in multiple stages. The firing jig disassembling apparatus further includes a jig taking-out mechanism that takes out a firing jig from the firing jigs piled up in multiple stages.

In the above-mentioned method for manufacturing a honeycomb structure in accordance with the present invention, the firing jig is comprised of a bottom member and a sidewall member.

Moreover, desirably, the bottom member is usable as a degreasing jig.

In the method for manufacturing a honeycomb structure, the firing jig is preferably comprised of a molded body placing member and a sidewall member that is integrally formed under the molded body placing member. The firing jig is preferably usable as a degreasing jig.

In the above-mentioned method for manufacturing a honeycomb structure in accordance with the present invention, the firing jig assembling apparatus and/or the firing jig disassembling apparatus include the conveyor that moves intermittently, and upon stopping of the conveyor, the conveyor shifts from a moving state at a moving speed of about 1.5 m/min or less to a stopped state.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
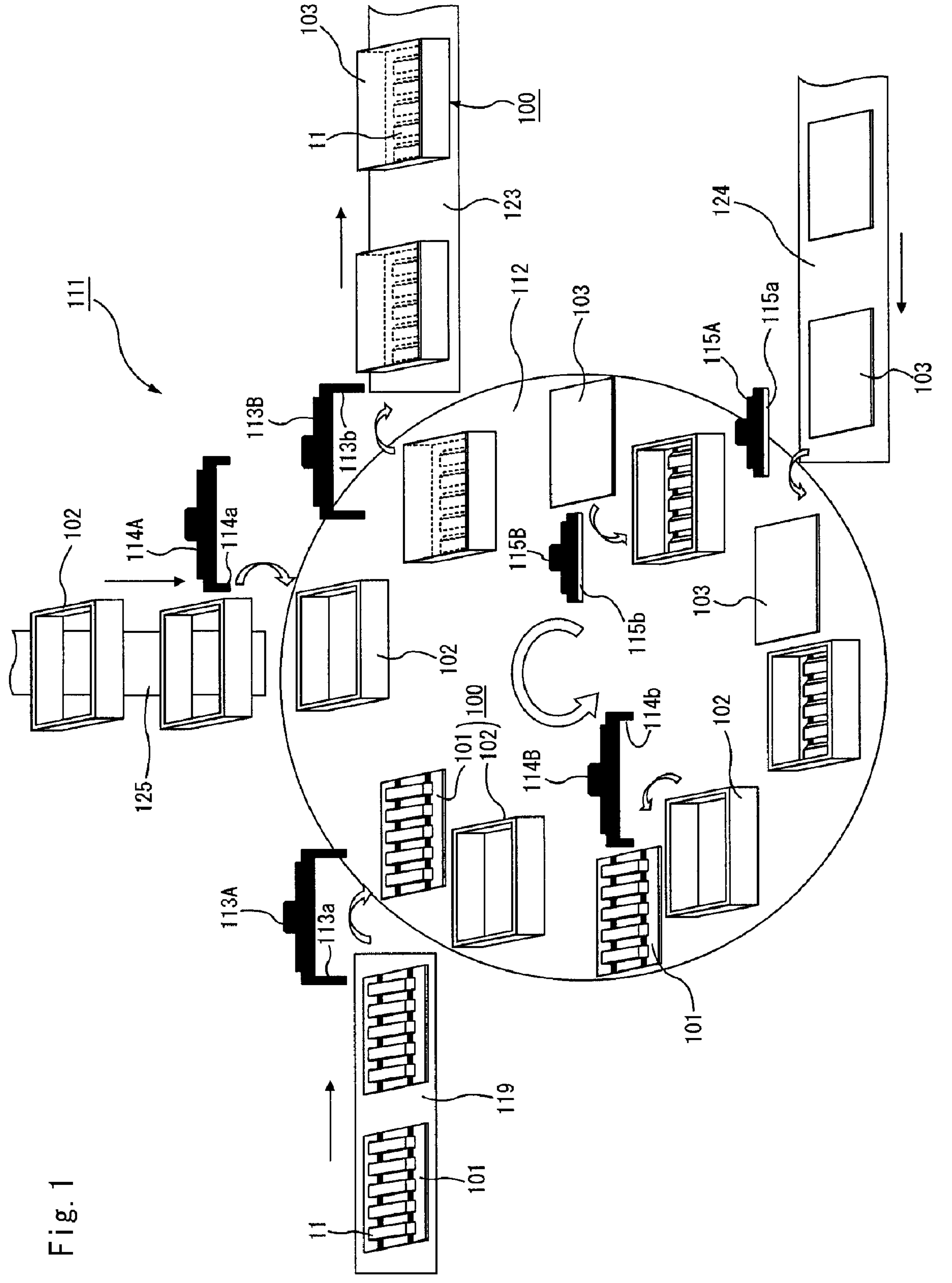
FIG. 1 is a conceptual view that schematically shows the outline of a firing jig assembling apparatus in accordance with one embodiment of the present invention.

The embodiments will now be described with reference to the accompanying drawings, wherein like reference numerals designate corresponding or identical elements throughout the various drawings.

The firing jig assembling apparatus in accordance with an embodiment of the present invention includes a robot arm; and a table or a conveyor for placing a firing jig thereon with a ceramic molded body being mounted on the firing jig upon firing the ceramic molded body, a lid member being attached to the firing jig that mounts the ceramic molded body thereon on the table or the conveyor.

The firing jig assembling apparatus further includes a lid member attaching mechanism that attaches the lid member by using the robot arm to a predetermined position of the firing jig placed on the table or the conveyor.

The firing jig assembling apparatus in accordance with the embodiment of the present invention, which includes a robot arm and a table or a conveyor, automatically carries out a process for attaching a lid member to a firing jig on which a ceramic molded body is mounted so that this process becomes easier to be carried out efficiently without the need for manual labor.

The firing jig disassembling apparatus in accordance with an embodiment of the present invention includes a robot arm; and a table or a conveyor for placing thereon a firing jig to which a lid member is attached, with a ceramic molded body being mounted on the firing jig upon firing the ceramic molded body.

The lid member attached to the firing jig is detached on the table or the conveyor.

The firing jig disassembling apparatus further includes a lid member detaching mechanism that detaches the lid member by using the robot arm from the firing jig placed on the table or the conveyor with the lid member being attached thereto.

The disassembling apparatus in accordance with the embodiment of the present invention, which includes a robot arm and a table or a conveyor, automatically carries out a process for detaching a lid member from a firing jig on which a fired ceramic molded body (ceramic fired body) is placed so that this process becomes easier to be carried out efficiently without the need for manual labor.

The circulating apparatus in accordance with an embodiment of the present invention includes a firing jig assembling apparatus which includes a robot arm, and a table of a conveyor for placing a firing jig thereon with a ceramic molded body being mounted on the firing jig upon firing the ceramic molded body, a lid member being attached to the firing jig that mounts the ceramic molded body thereon on the table or the conveyor; a firing furnace used for firing the ceramic molded body mounted on the firing jig; a firing jig disassembling apparatus which includes a robot arm, and a table or a conveyor for placing thereon a firing jig to which a lid member is attached, with a ceramic molded body being mounted on the firing jig upon firing the ceramic molded body, the lid member attached to the firing jig being detached on the table or the conveyor; and a transporting conveyor that transports at least either one of the lid member that is detached in the firing jig disassembling apparatus and the firing jig to the firing jig assembling apparatus.

The firing jig assembling apparatus of the circulating apparatus includes a lid member attaching mechanism that attaches the lid member by using the robot arm to a predetermined position of the firing jig placed on the table or the conveyor; and a jig delivering mechanism that delivers the firing jig which has the ceramic molded body being mounted thereon and the lid member being attached thereto, to the firing furnace.

The firing jig disassembling apparatus of the circulating apparatus further includes a jig receiving mechanism that receives the firing jig which has the fired ceramic molded body being mounted thereon and the lid member being attached thereto, from the firing furnace; and a lid member detaching mechanism that detaches the lid member by using the robot arm from the firing jig placed on the table or the conveyor with the lid member being attached thereto.

The circulating apparatus in accordance with the embodiment of the present invention includes a firing jig assembling apparatus, a firing furnace, a firing jig disassembling apparatus and a transporting conveyor, and thus it becomes easier to automatically carry out a sequence of processes including a process for attaching a lid member to the firing jig, a firing process, a process for detaching the lid member and a process for transporting the detached lid member; therefore, it becomes easier to fire the honeycomb molded body efficiently without the need for manual labor.

The method for firing a ceramic molded body in accordance with an embodiment of the present invention includes mounting a ceramic molded body on a firing jig; and firing the ceramic molded body by allowing the firing jig which has the ceramic molded body being mounted thereon to pass through the inside of a firing furnace. These steps are conducted by using a circulating apparatus that includes a firing jig assembling apparatus which includes a robot arm, and a table or a conveyor for placing the firing jig thereon with the ceramic molded body being mounted on the firing jig upon firing the ceramic molded body, a lid member being attached to the firing jig that mounts the ceramic molded body thereon on the table or the conveyor; the firing furnace used for firing the ceramic molded body mounted on the firing jig; a firing jig disassembling apparatus which includes a robot arm, and a table or a conveyor for placing thereon a firing jig to which a lid member is attached, with a ceramic molded body being mounted on the firing jig upon firing the ceramic molded body, the lid member attached to the firing jig being detached on the table or the conveyor; and a transporting conveyor that transports at least either one of the lid member that is detached in the firing jig disassembling apparatus and the firing jig to the firing jig assembling apparatus.

The firing jig assembling apparatus which is used in the method includes a lid member attaching mechanism that attaches the lid member by using the robot arm to a predetermined position of the firing jig placed on the table or the conveyor; and a jig delivering mechanism that delivers the firing jig which has the ceramic molded body being mounted thereon and the lid member being attached thereto, to the firing furnace.

The firing jig disassembling apparatus which is used in the method further includes a jig receiving mechanism that receives the firing jig which has the fired ceramic molded body being mounted thereon with the lid member being attached thereto, from the firing furnace; and a lid member detaching mechanism that detaches the lid member by using the robot arm from the firing jig placed on the table or the conveyor with the lid member being attached thereto.

In the method for firing a ceramic molded body in accordance with the embodiment of the present invention, since the firing process is carried out by using a circulating apparatus having the firing jig assembling apparatus, the firing furnace, the firing jig disassembling apparatus and the transporting conveyor, it becomes easier to automatically carry out a sequence of processes including a process for attaching a lid member to the firing jig, a firing process, a process for detaching the lid member and a process for transporting the detached lid member, and consequently it becomes easier to fire the ceramic molded body efficiently without the need for manual labor.

The method for manufacturing a honeycomb structure in accordance with an embodiment of the present invention includes manufacturing a pillar-shaped honeycomb molded body having a large number of cells longitudinally placed in parallel with one another with a cell wall therebetween by molding a ceramic material; mounting the honeycomb molded body onto a firing jig; and firing the honeycomb molded body mounted on the firing jig.

The step of firing the honeycomb molded body is carried out by using a circulating apparatus that includes a firing jig assembling apparatus which includes a robot arm, and a table or a conveyor for placing the firing jig thereon with the honeycomb molded body being mounted on the firing jig upon firing the honeycomb molded body, a lid member being attached to the firing jig that mounts the honeycomb molded body thereon on the table or the conveyor; a firing furnace used for firing the ceramic molded body mounted on the firing jig; a firing jig disassembling apparatus which includes a robot arm, and a table or a conveyor for placing thereon a firing jig to which a lid member is attached, with a honeycomb molded body being mounted on the firing jig upon firing the honeycomb molded body, the lid member attached to the firing jig being detached on the table or the conveyor; and a transporting conveyor that transports at least either one of the lid member that is detached in the firing jig disassembling apparatus and the firing jig to the firing jig assembling apparatus.

The firing jig assembling apparatus which is used in the method includes a lid member attaching mechanism that attaches the lid member by using the robot arm to a predetermined position of the firing jig placed on the table or the conveyor; and a jig delivering mechanism that delivers the firing jig which has the honeycomb molded body being mounted thereon and the lid member being attached thereto, to the firing furnace.

The firing jig disassembling apparatus which is used in the method further includes a jig receiving mechanism that receives the firing jig which has the fired honeycomb molded body being mounted thereon with the lid member being attached thereto, from the firing furnace; and a lid member detaching mechanism that detaches the lid member by using the robot arm from the firing jig placed on the table or the conveyor with the lid member being attached thereto.

In the method for manufacturing a honeycomb structure in accordance with the embodiment of the present invention, since the circulating apparatus having the firing jig assembling apparatus, the firing furnace, the firing jig disassembling apparatus and the transporting conveyor is used, it becomes easier to automatically carry out a sequence of firing processes of a honeycomb molded body including a process for attaching a lid member to the firing jig, a firing process, a process for detaching the lid member and a process for transporting the detached lid member, and consequently it becomes easier to manufacture a honeycomb structure efficiently without the need for manual labor.

First, the following description will discuss a firing jig assembling apparatus in accordance with the embodiment of the present invention.

In the present specification, the robot arm refers to an arm that has active joints including motors and the like, and also has inactive joints without motors and the like, if necessary.

FIG. 1 is a conceptual view that schematically shows the outline of the firing jig assembling apparatus in accordance with one embodiment of the present invention.

As shown in FIG. 1, a firing jig assembling apparatus 111 includes two robot arms 113 (113A, 113B), two robot arms 114 (114A, 114B), two robot arms 115 (115A, 115B) and a rotation table 112 that functions as a table for placing thereto the firing jig 100 on which a ceramic molded body 11 is mounted. Here, the firing jig 100 is comprised of a bottom member 101 and sidewall members 102.

This firing jig assembling apparatus 111 automatically carries out processes in which a lid member 103 is attached to the firing jig 100 on which a ceramic molded body 11 is mounted.

Moreover, as will be described later in detail, the firing jig assembling apparatus 111 also automatically carries out processes in which sidewall members are attached to a bottom member 101 on the rotation table 112.

In the firing jig assembling apparatus 111, the robot arm 113 has a grasping mechanism, and thus has a function for grasping and shifting the firing jig 100 including the bottom member 101; the robot arm 114 also has a grasping mechanism, and thus has a function for grasping and shifting the sidewall member 102 to be assembled; and the robot arm 115 has a suction mechanism, and thus has a function for suction-holding and shifting the lid member 103 to be assembled.

In the firing jig assembling apparatus 111, the robot arms 113 to 115 have the above-mentioned mechanisms; however, each of the robot arms 113 to 115 may have both of the suction mechanism and grasping mechanism, or may have either one of the mechanisms.

Here, the robot arms 113 to 115 include air cylinders, and thus move in vertical directions. Moreover, portions, extended from the cylinders, are engaged with ball screws placed in the horizontal direction, and movements in the horizontal direction are obtained by moving mechanisms utilizing the ball screws.

The firing jig 100 to be used in the firing jig assembling apparatus 111 is a firing jig comprised of a bottom member and a sidewall member. Referring to the drawings, this firing jig is explained in more detail.

Figure 2:
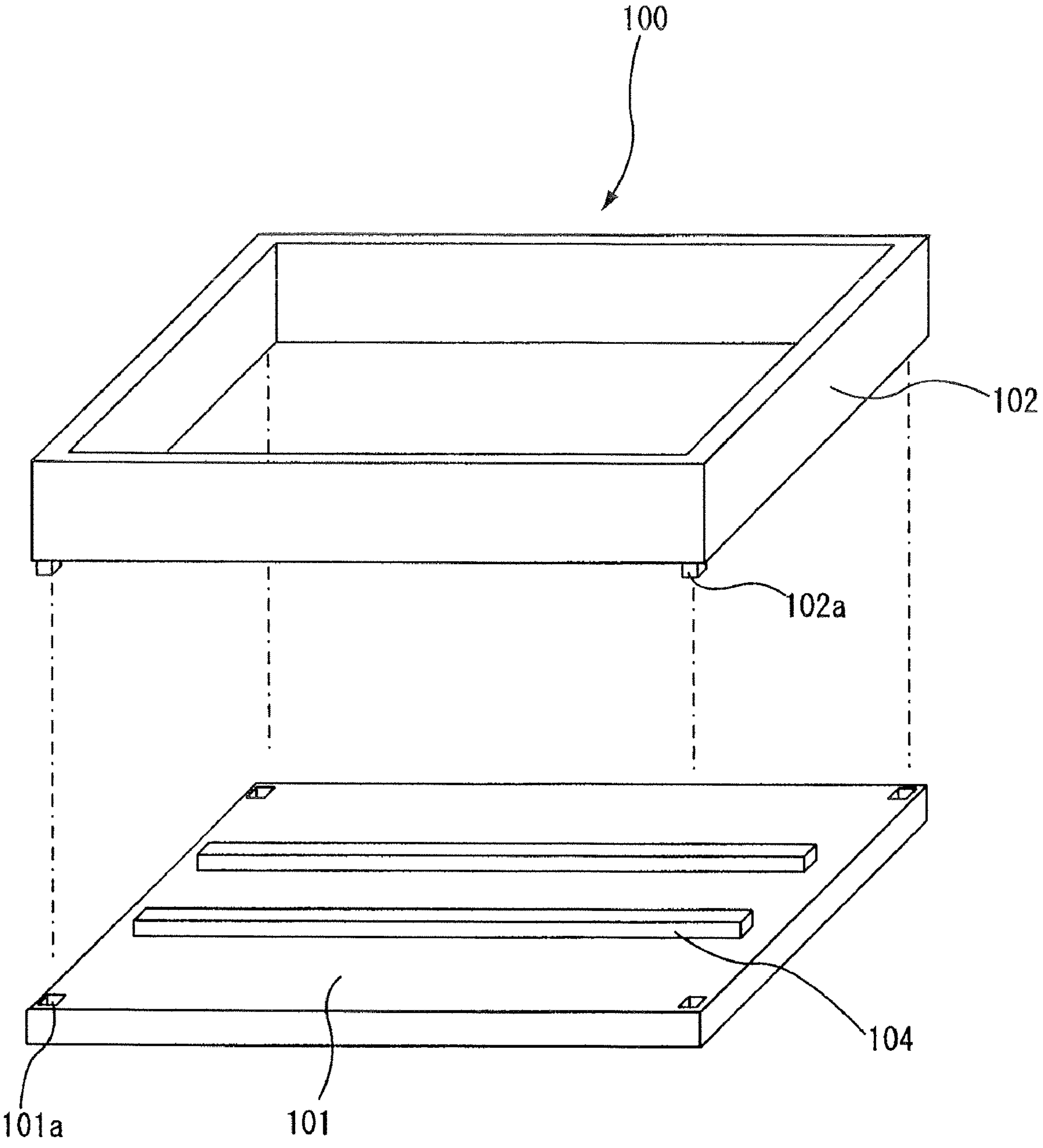
FIG. 2 is an exploded perspective view that schematically shows one example of one embodiment of a firing jig used in the present invention.

FIG. 2 is an exploded perspective view that schematically shows one example of one embodiment of a firing jig used in the present invention.

As shown in FIG. 2, the firing jig 100 is comprised of a plate-shaped bottom member 101 and a sidewall member 102 having a hollow rectangular pillar shape.

Moreover, in the firing jig 100, through holes 101*a* are formed near four corners on the upper face of the bottom member 101, and convex portions 102*a* are formed near four corners of the bottom face of the sidewall member 102. Thus, by fitting these convex portions 102*a* to the through holes 101*a*, the sidewall member 102 is positively secured to the bottom member 101.

Here, in the firing jig to be used in the embodiment of the present invention, it is not necessarily required to form the through holes and the convex portions.

Moreover, with respect to the bottom member forming the firing jig to be used in the embodiment of the present invention, although not formed in the bottom member 101 shown in FIG. 2, a groove portion may be formed on the bottom face, and in this case, the groove portion may be formed into such a shape that upon grasping by using the robot arm, one portion of the grasping portion can be fitted to the groove. Thus, it becomes easier for the bottom member 101 to be positively grasped by the robot arm.

Furthermore, with respect to the sidewall member forming the firing jig to be used in the embodiment of the present invention, although not formed in the side face member 102 shown in FIG. 2, convex portions that are the same as the convex portions 102*a* may be formed near four corners on the upper face thereof. Thus, for example, in the case where a lid member having through holes that fit to the convex portions is used, it becomes easier for the lid member to be positively secured thereto.

In the firing jig 100 having the above-mentioned structure, by further attaching a lid member thereto in a manner so as to cover the ceramic molded body, as will be described later, it becomes easier to positively fire the ceramic molded body in a firing furnace.

Moreover, vent holes may be formed in the bottom member and the sidewall member on demand.

The firing jig to be used in the firing jig assembling apparatus in accordance with the embodiment of the present invention is desirably comprised of a bottom member and a sidewall member, as shown in FIG. 2.

When each of the bottom member and the sidewall member is a discrete member, it becomes easier for the ceramic molded body to be mounted on the bottom member prior to attaching the sidewall member thereto; therefore, the mounting process of the ceramic molded body becomes easier to carry out, and by providing the sidewall member, it becomes easier to pile up the firing jigs in multiple stages.

Moreover, on the bottom member 101 of the firing jig 100 shown in FIG. 2, narrow band-shaped carbon fiber mats 104 are secured to two portions in parallel with each other, and a ceramic molded body is mounted thereon through the carbon fiber mats 104. Here, the carbon fiber mats 104 may be provided on demand.

The carbon fiber mats are installed so as to prevent the ceramic molded body from directly coming into contact with the upper face of the bottom member, and mats made from fibers other than carbon fibers may be installed as long as they have a resistance to the firing treatment temperature, and porous members made from a ceramic material and the like may be installed in place of carbon fiber mats.

In the firing jig assembling apparatus 111, a sidewall member 102, transported by a conveyor 125 from the outside, is first placed on the rotation table 112 by the robot arm 114A.

The robot arm 114A has a grasping mechanism so that the sidewall member 102 is shifted onto the rotation table 112 by grasping the side face of the sidewall member 102 using grasping portions 114*a*.

Next, when the rotation table 112 rotates by a predetermined angle, a bottom member 101, which has been transported from the outside by the bottom member transporting conveyor 119 with a ceramic molded body 11 being placed thereon, is placed on the rotation table 112 by the robot arm 113A.

The robot arm 113A, which has a grasping mechanism, grasps the bottom member 101 by grasping portions 113*a*, and shifts the bottom member 101 onto the rotation table 112, with the ceramic molded body 11 being placed thereon.

Here, the rotation table 112 intermittently repeats rotating and stopping operations.

Next, as the rotation table 112 rotates, the robot arm 114B is allowed to grasp the sidewall member 102 and attach the sidewall member 102 to the bottom member 101 on which the ceramic molded body 11 is placed. The robot arm 114B has the same structure as the robot arm 114A.

Thus, the ceramic molded body is mounted on the firing jig. Next, when the rotation table 112 rotates, a plate-shaped lid member 103, transported by a conveyor 124 from the outside, is placed on the rotation table 112 by the robot arm 115A.

The robot arm 115A, which has a suction mechanism, suction-holds the upper face of the lid member 103 by a suction portion 115*a*, and shifts the lid member 103 onto the rotation table 112.

Next, when the rotation table 112 rotates, the robot arm 115B is allowed to suction-hold the lid member 103 and to attach it onto the sidewall member 102 in a manner so as to cover the firing jig 100.

Here, the robot aim 115B has the same structure as the robot arm 115A.

Therefore, in the firing jig assembling apparatus 111, the robot arm 115B functions as a lid member attaching mechanism.

Here, the lid member 103 shown in FIG. 1 has a flat-plate shape; however, for example, in the case where a sidewall member in which convex portions are formed near four corners of the upper face is used as the above-mentioned sidewall member, it may have a shape in which through holes are formed near four corners of the lid member so that the convex portions on the upper face of the sidewall member are fitted thereto.

Moreover, vent holes may be formed in the lid member 103 on demand.

Next, when the rotation table 112 rotates, the firing jig 100 which has the ceramic molded body 11 mounted thereon and to which the lid member 103 is attached, is placed on a conveyor 123 by the robot arm 113B. Thus, the firing jig 100 placed on the conveyor 123 is transported to an apparatus used in the next process (for example, firing process).

Here, the robot arm 113B has the same structure as the robot arm 113A.

Specific examples of the bottom member transporting conveyor 119 and conveyors 123 to 125, installed in the firing jig assembling apparatus 111, include: belt conveyors, chain conveyors, roller conveyors, pallet conveyors and the like.

Moreover, in the firing jig assembling apparatus 111, the bottom member transporting conveyor 119 moves intermittently, and upon stopping of the bottom member transporting conveyor 119 that moves intermittently, it is desirable for the conveyor to shift from a moving state at a moving speed of about 1.5 m/min or less to the stopped state.

In the case where the moving speed of the conveyor immediately before the shift to the stopped state is about 1.5 m/min or less, upon stopping, it becomes difficult for the ceramic molded body 11 to move on the bottom member 101 due to force of inertia.

Moreover, in the firing jig assembling apparatus that has been explained above, the sidewall member is attached to the bottom member on the rotation table 112; however, for example, at the time when the bottom member 101 on which the ceramic molded body 11 is mounted is transported onto the rotation table 112, the sidewall member 102 may have already been attached to the bottom member 101.

Here, in the firing jig assembling apparatus shown in FIG. 1, the number of robot arms is not particularly limited to six, and may be less than six or more than six, and in a case where the number of robot arms is less than six, one robot arm is allowed to have a plurality of functions.

Figure 3:
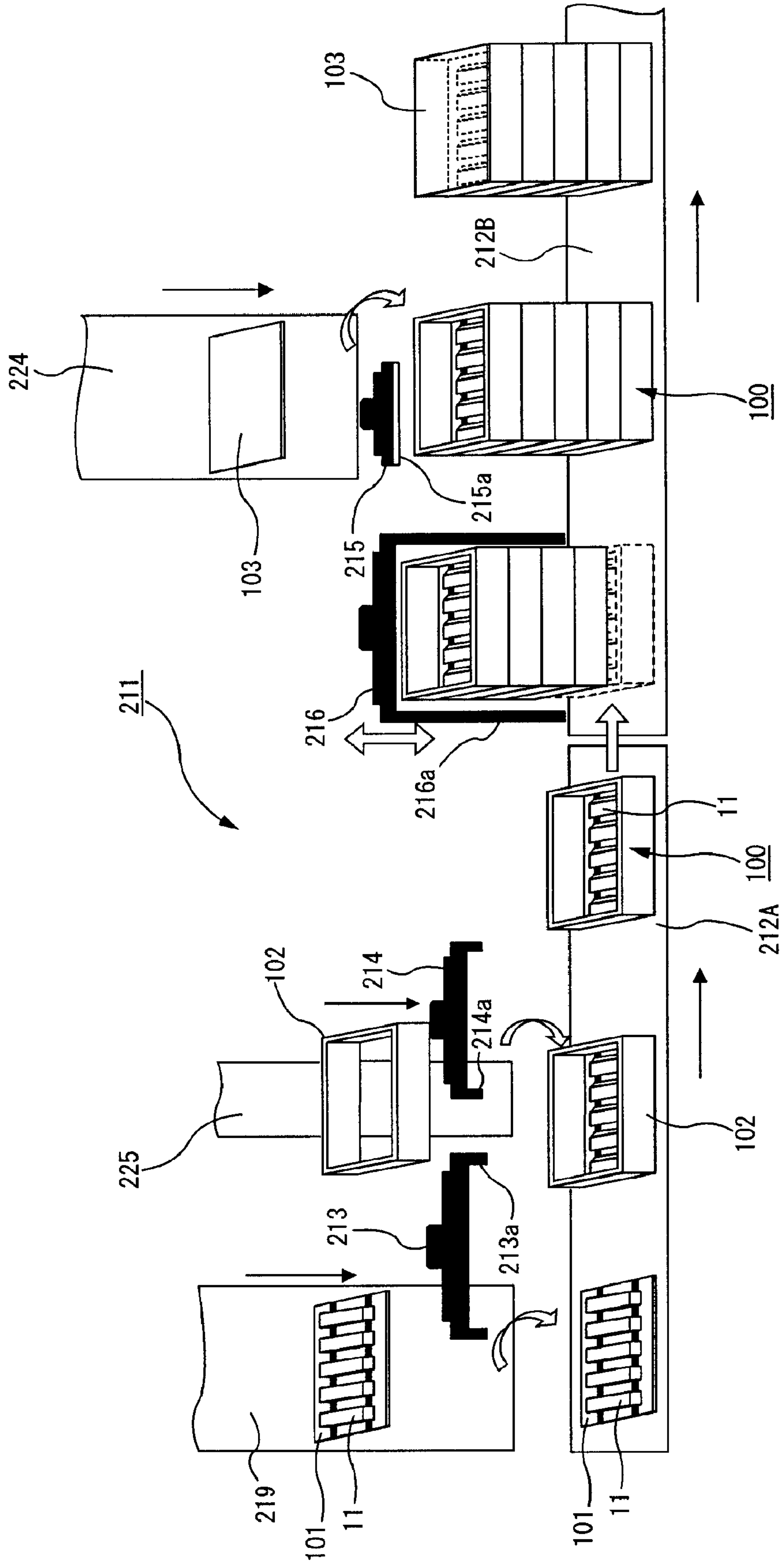
FIG. 3 is a conceptual view that schematically shows the outline of another example of the firing jig assembling apparatus in accordance with one embodiment of the present invention.
Figure 4:
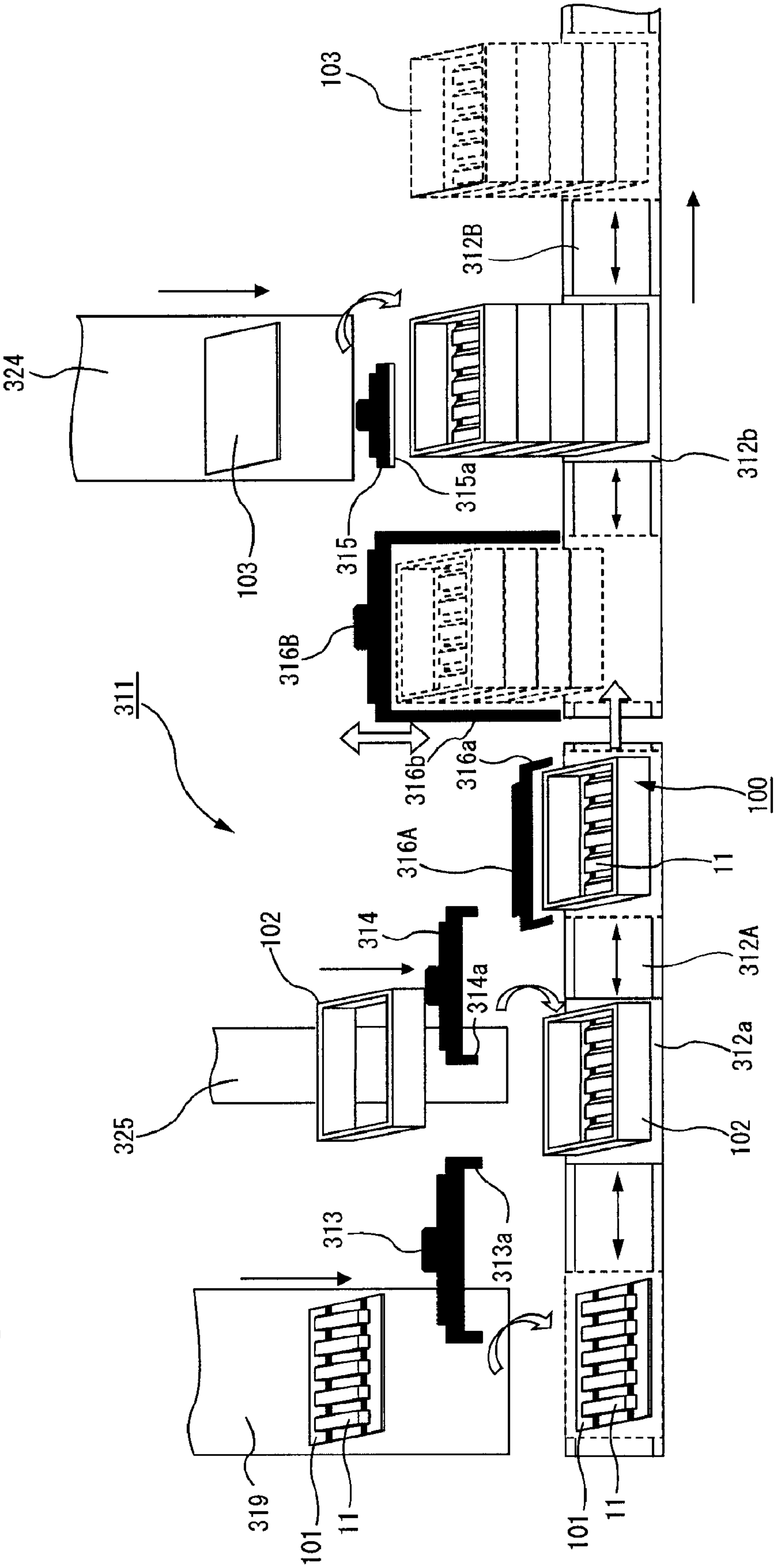
FIG. 4 is a conceptual view that schematically shows the outline of still another example of the firing jig assembling apparatus in accordance with one embodiment of the present invention.

Not limited to the structure having the rotation table as shown in FIG. 1, the firing jig assembling apparatus in accordance with one embodiment of the present invention may have a structure having conveyors, for example, shown in FIGS. 3 and 4.

FIGS. 3 and 4 are conceptual views that schematically show the outline of another example of the firing jig assembling apparatus in accordance with one embodiment of the present invention, respectively.

A firing jig assembling apparatus 211, shown in FIG. 3, includes robot arms 213 to 216 and jig assembling belt conveyors 212A, 212B each of which functions as a conveyor for placing thereon the firing jig 100 on which the ceramic molded body 11 is mounted.

In the firing jig assembling apparatus 211, processes for attaching the lid member 103 to the firing jig 100 which has the ceramic molded body 11 mounted thereon becomes also easier to be carried out automatically. Here, the structure of the firing jig is the same as that described earlier.

Moreover, in the firing jig assembling apparatus 211, processes for piling up the firing jigs 100, each having the ceramic molded body mounted thereon, in multiple stages becomes easier to be carried out automatically, as will be described later.

In the firing jig assembling apparatus 211 the robot arm 213 has the same structure as the robot arm 113 forming the firing jig assembling apparatus 111, the robot arm 214 has the same structure as the robot arm 114 forming the firing jig assembling apparatus 111, and the robot arm 215 has the same structure as the robot arm 115 forming the firing jig assembling apparatus 111.

Moreover, the robot arm 216 has a grasping mechanism (grasping portion 216*a*), and thus has functions for grasping a firing jig of one stage or piled firing jigs to shift it in vertical directions, and, for example, while the firing jig is grasped and raised, another firing jig is newly placed below the raised firing jig by the shifting operation of the firing jig 100 by jig assembling conveyors 212A, 212B, and by piling up the raised firing jig onto the other firing jig, it becomes easier for the firing jigs to be piled up in multiple stages. Here, the robot arm 216 has air cylinders, thereby moving in vertical directions.

In the firing jig assembling apparatus 211, first, a bottom member 101 with the ceramic molded body 11 placed thereon, transported from the outside by the bottom member transporting conveyor 219, is placed on the jig assembling conveyor 212A that intermittently moves, by the robot arm 213.

At this time, the jig assembling belt conveyor 212A is stopped.

Next, when the jig assembling belt conveyor 212A is again stopped after having been shifted by a predetermined distance, the sidewall member 102 which has been transported from the outside by the conveyor 225 is grasped by the robot arm 214 so that the sidewall member 102 is attached to the bottom member 101 on which the ceramic molded body 11 is placed.

Thereafter, the firing jig 100, which is comprised of the bottom member and the sidewall member and with the ceramic molded body 11 being mounted thereon, is transported to an apparatus used in the next jig assembling belt conveyor 212B by the movement of the jig assembling belt conveyor 212A.

Here, on the jig assembling belt conveyor 212B side, the firing jig 100, which has been preliminarily transported, is raised upward by the robot arm 216, and a newly transported firing jig 100 is placed below the raised firing jig 100. Thereafter, the raised firing jig 100 is piled up on the newly transported firing jig 100

In this manner, on the jig assembling conveyor 212B side, first, firing jigs 100 are piled up in a predetermined number of stages. Therefore, in the firing jig assembling apparatus 211, the robot arm 216 functions as a jig piling mechanism.

After firing jigs 100 have been piled up in a predetermined number of stages, the jig assembling belt conveyor 212B is then again stopped after having been shifted by a predetermined distance, and the robot arm 215 suction-holds the lid member 103 that has been transported from the outside by the conveyor 224, and attaches the lid member 103 in a manner so as to cover the firing jig on the uppermost stage.

Therefore, in the firing jig assembling apparatus 211, the robot arm 215 functions as a lid member attaching mechanism.

After the lid member 103 has been attached, the jigs are transported to an apparatus used in the next process (for example, firing process).

Here, upon piling up the firing jigs 100 on the jig assembling belt conveyor 212B, the number of stages is not particularly limited, and any number of stages may be used; however, normally, the number of stages is set to 5 to 10 stages. Of course, without carrying out the piling process, the lid member may be attached to the jig, and the jig may be transported to an apparatus used in the next process.

Moreover, in the firing jig assembling apparatus in accordance with the embodiment of the present invention having the structure shown in FIG. 3, the number of robot arms is not particularly limited to four, and may be less than four or more than four, and in a case where the number of robot arms is less than four, one robot arm is allowed to have a plurality of functions.

More specifically, for example, in place of the robot arm 213 used for moving the bottom member and the robot arm 214 used for attaching the sidewall member, one robot arm may be designed to carry out the moving operation of the bottom member and the attaching operation of the sidewall member.

Moreover, in the firing jig assembling apparatus 211 shown in FIG. 3, upon piling up the firing jigs 100 in multiple stages, the jigs are piled up in multiple stages by sending the firing jig 100 transported later below the firing jig 100 that has been preliminarily transported. However, in the firing jig assembling apparatus in accordance with the embodiment of the present invention, the firing jigs 100 may be piled up in multiple stages by successively piling up the firing jigs 100 transported later on the firing jig 100 that has been preliminarily transported.

Moreover, in the firing jig assembling apparatus 211 shown in FIG. 3, the jig assembling belt conveyors 212A, 212B are conveyors that move intermittently. In this case, upon stopping of each of the jig assembling belt conveyors 212A, 212B, it is desirable for the conveyor to shift from a moving state at a moving speed of about 1.5 m/min or less to the stopped state.

In the case where the moving speed of the conveyor immediately before the shift to the stopped state is about 1.5 m/min or less, upon stopping, it becomes difficult for the ceramic molded body 11 to move on the bottom member 101 due to force of inertia.

If it is difficult for the ceramic molded bodies 11 to move on the bottom member 101, it becomes difficult for the ceramic molded bodies 11, which have been placed with a predetermined interval in accordance with the firing conditions, to have mutually different intervals to cause deviations in the degree of firing. Thus, it becomes difficult for the ceramic molded bodies 11 to be mutually made in contact with one another when moved, or for the ceramic molded bodies 11 to come into contact with the sidewall member 102, to cause damages to the ceramic molded bodies 11.

Moreover, upon shifting the moving state at a moving speed of about 1.5 m/min or less to the stopped state, the conveyor may shift from the moving state to the stopped state instantaneously, or the conveyor may shift from the moving state to stopped state by reducing the moving speed gradually.

Therefore, when the ceramic molded bodies 11 placed on the bottom member 101 are transported at a speed more than about 1.5 m/min, the moving speed is desirably reduced to a speed of about 1.5 m/min or less once, prior to the stoppage, and then reached to the stopped state.

In the firing jig assembling apparatus 211 shown in FIG. 3, the bottom member transporting conveyor 219 is also a conveyor that moves intermittently. In this case also, upon stopping, the bottom member transporting conveyor 219 desirably shifts from a moving state at a moving speed of about 1.5 m/min or less to the stopped state.

The firing jig assembling apparatus in accordance with the embodiment of the present invention may have a structure as shown in FIG. 4.

A firing jig assembling apparatus 311 shown in FIG. 4 includes robot arms 313 to 315, 316A, 316B, and jig assembling pallet conveyors 312A, 312B each of which functions as a conveyor for placing thereon the firing jig 100 with the ceramic molded body 11 being mounted thereon.

This firing jig assembling apparatus 311 also automatically carries out processes for attaching the lid member 103 to the firing jig 100 with the ceramic molded body 11 being mounted thereon. Here, the structure of the firing jig is the same as that explained earlier.

The firing jig assembling apparatus 311 is different from the firing jig assembling apparatus 211 shown in FIG. 3 in that, in place of the jig assembling belt conveyors 212A, 212B, jig assembling pallet conveyors 312A, 312B are installed and in that robot arms 316A, 316B functioning as jig piling mechanisms are prepared, and the other arrangements are the same as those of the firing jig assembling apparatus 211.

In the firing jig assembling apparatus 311, first, the bottom member 101 with the ceramic molded body 11 being mounted thereon, transported from the outside by the bottom member transporting conveyor 319, is placed on the pallet 312*a* of the jig assembling pallet conveyor 312A by the robot arm 313.

Next, when, after having been shifted by a predetermined distance toward the jig assembling pallet conveyor 312B, the pallet 312*a* is stopped with the bottom member 101 being placed thereon, the sidewall member 102, transported from the outside by the conveyor 325, is grasped by the robot arm 314 so that the sidewall member 102 is attached to the bottom member 101 with the ceramic molded body 11 being mounted thereon, on the pallet 312*a*.

Next, after having been again shifted by a predetermined distance toward the jig assembling pallet conveyor 312B, the pallet 312*a* is stopped.

At this time, on the jig assembling pallet conveyor 312B side, the firing jig 100, preliminarily transported thereto, is grasped by the grasping portion 316*b* of the robot arm 316B, and raised upward, and a firing jig 100 to be newly placed, which is on the pallet 312*a*, is grasped and transported by the grasping portion 316*a* of the robot arm 316A, and placed onto the pallet 312*b* below the firing jig 100 that has been raised as described above. Thereafter, the firing jig 100 that has been raised above the newly placed firing jig 100 is piled up thereon.

In this manner, on the firing jig assembling pallet conveyor 312B side, first, firing jigs 100 are piled up in a predetermined number of stages. Therefore, in the firing jig assembling apparatus 311, the robot arms 316A, 316B function as jig piling mechanisms.

After firing jigs 100 have been piled up on the pallet 312*b* in a predetermined number of stages, the jig assembling pallet conveyor 312B is shifted by a predetermined distance, and then again stopped so that the robot arm 315 suction-holds the lid member 103 that has been transported from the outside and attaches it in a manner so as to cover the firing jig on the uppermost stage.

Therefore, in the firing jig assembling apparatus 311, the robot arm 315 functions as a lid member attaching mechanism.

After the lid member 103 has been attached, the jigs are transported to an apparatus used in the next process (for example, firing process).

Here, upon piling up the firing jigs 100 on the jig assembling pallet conveyor 312B, the number of stages is not particularly limited, and any number of stages may be used; however, normally, the number of stages is set to 5 to 10 stages. Of course, without carrying out the piling process, the lid member may be attached to the jig, and the jig may be transported to an apparatus used in the next process.

Moreover, in the firing jig assembling apparatus having the structure shown in FIG. 4, the number of robot arms is not particularly limited to five, and may be less than five or more than five, and in a case where the number of robot arms is less than five, one robot arm is allowed to have a plurality of functions.

More specifically, for example, in place of the robot arm 313 used for moving the bottom member and the robot arm 314 used for attaching the sidewall member, one robot arm may be designed to carry out the moving operation of the bottom member and the attaching operation of the sidewall member.

Furthermore, in the firing jig assembling apparatus 311 shown in FIG. 4, upon piling up the firing jigs 100 in multiple stages, the jigs are piled up in multiple stages by sending the firing jig 100 transported later below the firing jig 100 that has been preliminarily transported; however, in the firing jig assembling apparatus in accordance with the embodiment of the present invention, the firing jigs 100 may be piled up in multiple stages by successively piling up the firing jig 100 transported later on the firing jig 100 that has been preliminarily transported.

In the firing jig assembling apparatus 311 shown in FIG. 4, upon stopping each of the jig assembling pallet conveyors 312A, 312B and the bottom member transporting conveyor 319 that moves intermittently, it is desirable for the conveyors to shift from a moving state at a moving speed of about 1.5 m/min or less to the stopped state.

Figure 5:
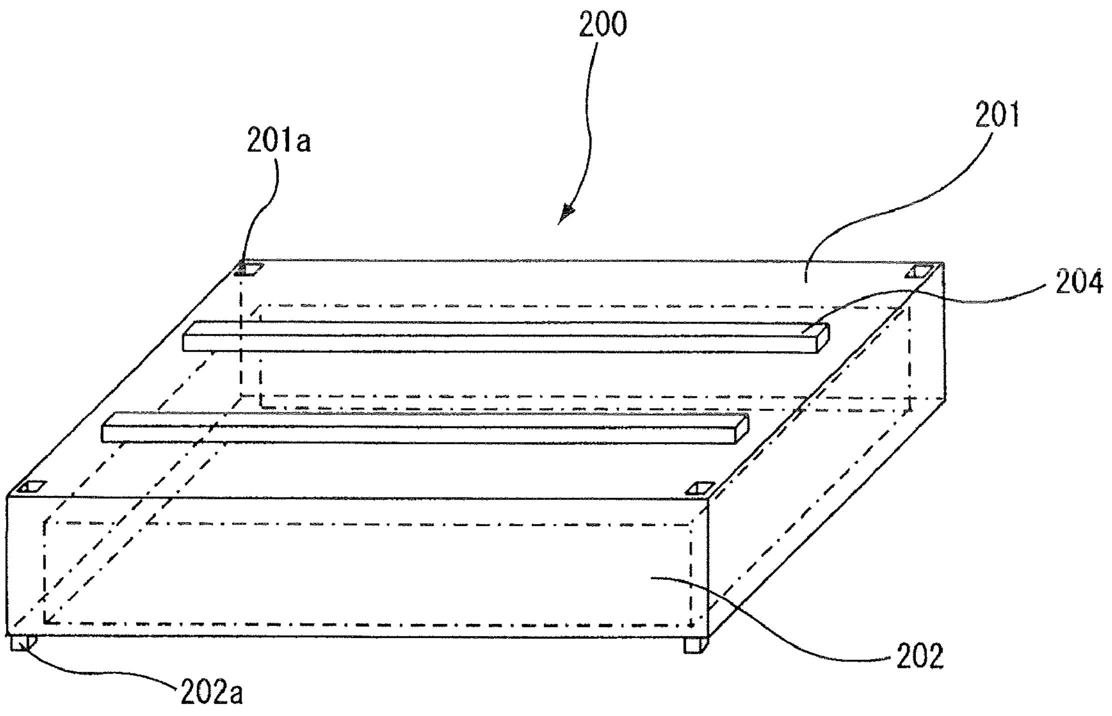
FIG. 5 is an exploded perspective view that schematically shows another example of one embodiment of the firing jig used in the present invention.

The firing jig to be used in the firing jig assembling apparatus in accordance with the embodiment of the present invention is not limited to the firing jig 100 shown in FIG. 2, for example, a firing jig as shown in FIG. 5 may be used.

FIG. 5 is an exploded perspective view that schematically shows another example of one embodiment of the firing jig used in the present invention.

The firing jig 200 shown in FIG. 5 is comprised of a molded body placing member 201 and a sidewall member 202 that is integrally formed on the lower side thereof.

Moreover, on the molded body placing member 201 of the firing jig 200 shown in FIG. 5, narrow band-shaped carbon fiber mats 204 are secured to two portions thereof in parallel with each other, in the same manner as the firing jig 100 shown in FIG. 2, and a ceramic molded body is placed thereon through the carbon fiber mats 204. Here, the carbon fiber mats 204 may be provided on demand.

The firing jig 200 of this kind can be desirably used when the firing jigs are piled up in multiple stages. By only piling up one firing jig 200 on the other firing jig 200, it becomes possible to form the sidewall member on the firing jig 200 on the lower stage.

In the firing jig 200, concave sections 201*a* are formed near four corners on the upper face of the molded body placing member 201, and convex portions 202*a* are formed near four corners of the bottom face of the sidewall member 202. Thus, by fitting these convex portions 202*a* to the concave sections 201*a* upon piling up a plurality of the firing jigs 200, it becomes easier for the firing jig 200 on the upper stage to be positively attached to the firing jig 200 on the lower stage.

Here, the above-mentioned convex portions and concave sections may be formed on demand.

In the case where the firing jig 200 shown in FIG. 5 is used in the firing jig assembling apparatus 211 shown in FIG. 3, it becomes unnecessary to provide the conveyor 225 used for transporting the sidewall member and the robot arm 214 used for attaching the sidewall member.

The same is true in the case where the firing jig 200 shown in FIG. 5 is used in the firing jig assembling apparatus 311 shown in FIG. 4.

Moreover, although not particularly shown in the drawings, the firing jig assembling apparatus in accordance with the embodiment of the present invention may include a table that is allowed to move through rails and the like in place of the jig assembling pallet conveyor, for example, in the firing jig assembling apparatus in accordance with the embodiment of the present invention having the structure shown in FIG. 4.

In this case, since the table is allowed to move in the same manner as the pallet of the jig assembling pallet conveyor, it becomes easier for the lid member to be attached to the firing jig on the table.

Referring to the drawings, the following description will discuss a firing jig disassembling apparatus in accordance with the embodiment of the present invention.

Figure 6:
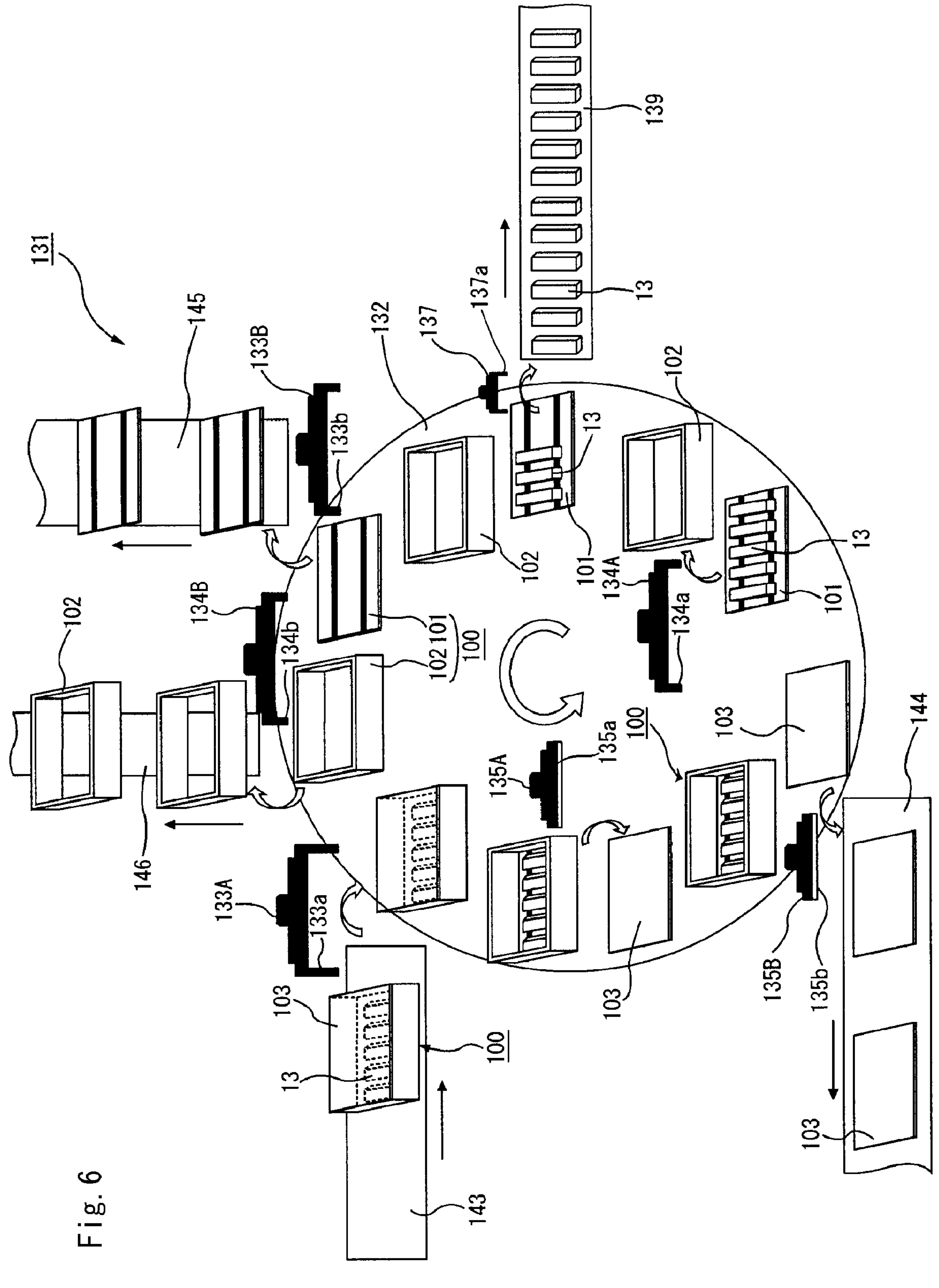
FIG. 6 is a conceptual view that schematically shows the outline of a firing jig disassembling apparatus in accordance with one embodiment of the present invention.

FIG. 6 is a conceptual view that schematically shows the outline of the firing jig disassembling apparatus in accordance with one embodiment of the present invention.

As shown in FIG. 6, the component members of the firing jig disassembling apparatus in accordance with the embodiment of the present invention are almost the same as those of the above-mentioned firing jig assembling apparatus in accordance with the embodiment of the present invention.

In other words, as shown in FIG. 6, a firing jig disassembling apparatus 131 includes two robot arms 133 (133A, 133B), two robot arms 134 (134A, 134B), two robot arms 135 (135A, 135B) and one robot arm 137, and also has a rotation table 132 serving as a table for placing thereon a firing jig 100 with a fired ceramic molded body (ceramic fired body) 13 being mounted thereon.

In the present specification, the ceramic molded body that has been fired is referred to as a ceramic fired body.

This firing jig disassembling apparatus 131 automatically carries out processes for detaching the lid member 103, which is attached in a manner so as to cover the firing jig 100 which is comprised of the sidewall member 102 and the bottom member 101 and on which the ceramic fired body 13 is placed. Here, the firing jig 100 has already been explained in the description of the firing jig assembling apparatus.

In the firing jig disassembling apparatus 131, the firing jig 100, which has been transported by a conveyor 143 and on which a ceramic fired body 13 is mounted with a lid member being attached thereto, is first placed on the rotation table 132 by the robot arm 133A. Here, the conveyor 143 intermittently moves. Moreover, the robot arm 133A has the same structure as the robot arm 113 that has been explained.

Next, when the rotation table 132 is allowed to rotate by a predetermined angle, the lid member 103 is removed from the firing jig 100 by the robot arm 135A. The robot arm 135A has the same structure as the robot arm 115 that has already been discussed.

Therefore, in the firing jig disassembling apparatus 131, the robot arm 135A functions as a lid member detaching mechanism.

Here, the rotation table 132 repeatedly rotates and stops intermittently.

When the rotation table 132 successively rotates, the lid member 103, which has already been detached, is delivered to the conveyor 144 by the robot arm 135B having a suction mechanism. Thus, the lid member 103 is transported to outside. Here, the robot arm 135B has the same structure as the robot arm 115 that has already been explained.

Here, after the rotation table 132 has further rotated, the sidewall member 102 is further detached from the firing jig 100 from which the lid member 103 has been removed. In this case, the robot arm 134A has the same structure as the robot arm 114 that has already been explained.

After the rotation table 132 has further rotated, the ceramic fired body 13 placed on the bottom member 101 is moved on the fired body carry-out conveyor 139 by the robot arm 137 in this case; thus, the ceramic fired body 13 is carried out to an apparatus used in the next process by the fired body carry-out conveyor 139. Here, the robot arm 137, which has a grasping portion 137*a*, grasps the ceramic fired body 13 on the bottom member 101, and places it on the fired body carry-out conveyor 139. The robot arm 137 may have a suction mechanism, or may have both of the suction mechanism and the grasping mechanism.

Additionally, in the mode shown in FIG. 6, the robot arm 137 grasps the ceramic fired bodies 13 one by one, and moves them; however, in place of the robot arm 137, the firing jig disassembling apparatus 131 may have a robot arm that can grasp or suction-hold a plurality of ceramic fired bodies 13 simultaneously.

Next, as the rotation table 132 rotates, the bottom member 101 and the sidewall member 102 are respectively moved onto the conveyors 145, 146 by the respective robot arms 133B, 134B, and then transported to outside by these conveyors. Here, the robot arms 133B, 134B have the same structures as those of the robot arms 113, 114 that have already been explained.

Moreover, in the firing jig disassembling apparatus in accordance with the embodiment of the present invention having the structure shown in FIG. 6, the number of robot arms is not particularly limited to seven, and may be less than seven or more than seven, and in a case where the number of robot arms is less than seven, one robot arm is allowed to have a plurality of functions.

More specifically, for example, in place of the two robot arms 133B, 134B, one robot arm may be designed to carry out the moving operation of the bottom member and the attaching operation of the sidewall member.

Specific examples of the fired body carry-out conveyor 139 and the conveyors 143 to 146 to be installed in the firing jig disassembling apparatus include a belt conveyor, a chain conveyor, a roller conveyor, a pallet conveyor and the like.

In the firing jig disassembling apparatus 131 shown in FIG. 6, the conveyor 143 is allowed to move intermittently, and upon stopping of the conveyor 143 that moves intermittently, it is desirable for the conveyor to shift from a moving state at a moving speed of about 1.5 m/min or less to the stopped state.

Figure 7:
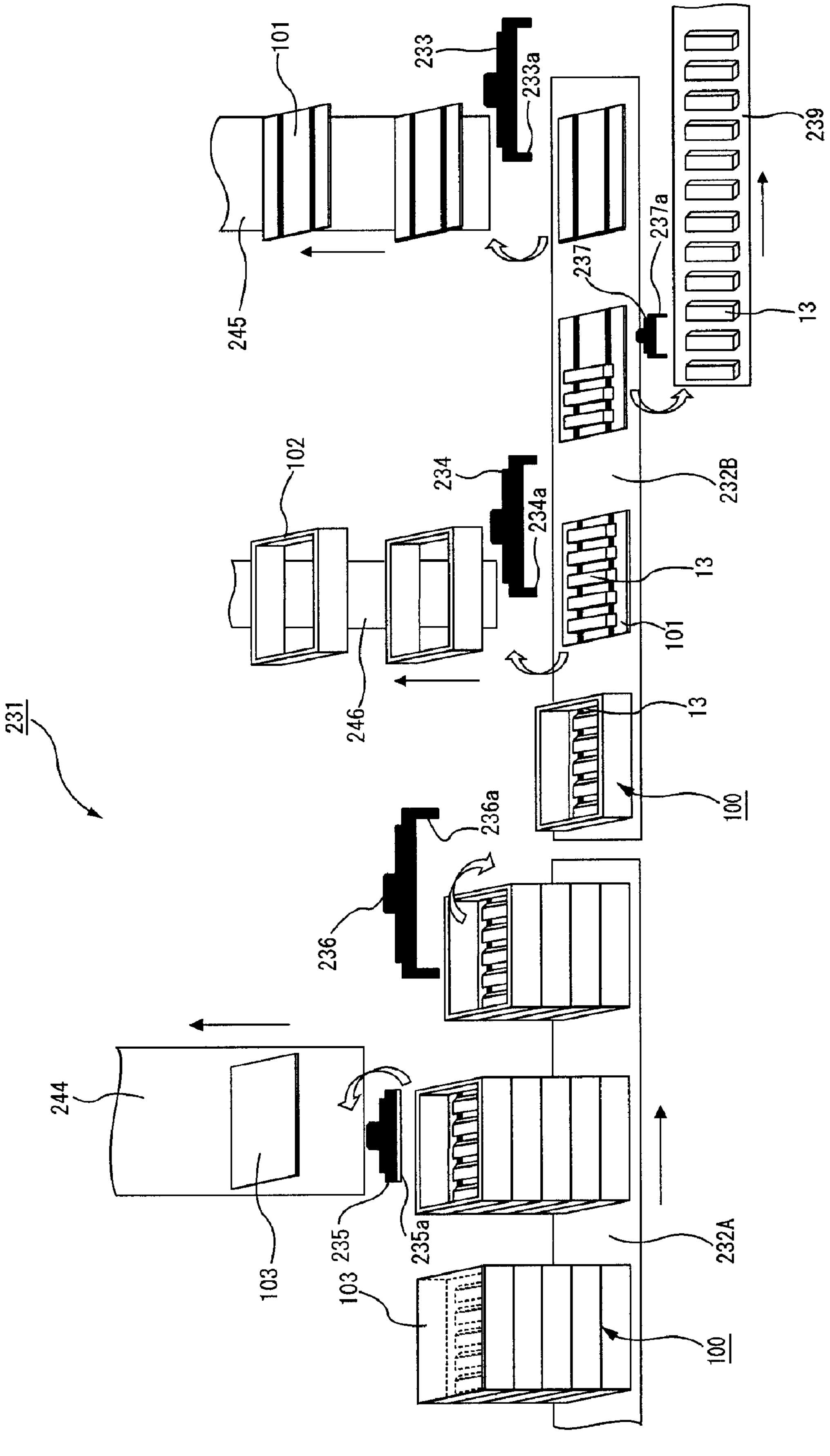
FIG. 7 is a conceptual view that schematically shows the outline of another example of the firing jig disassembling apparatus in accordance with one embodiment of the present invention.
Figure 8:
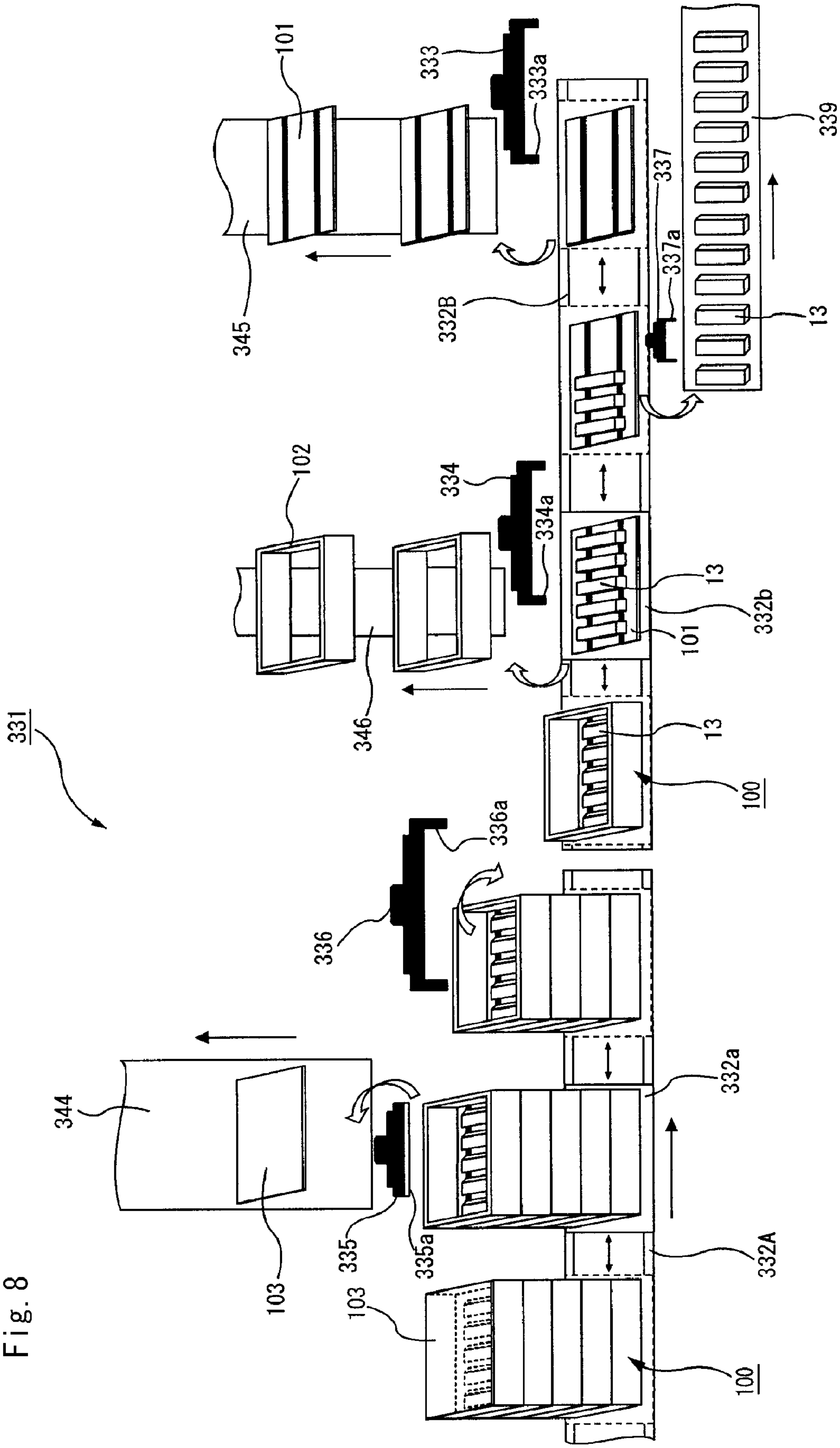
FIG. 8 is a conceptual view that schematically shows the outline of still another example of the firing jig disassembling apparatus in accordance with one embodiment of the present invention.

The structure of the firing jig disassembling apparatus in accordance with the embodiment of the present invention, not limited to the structure having the rotation table as shown in FIG. 6 may have, for example, structures provided with conveyors as shown in FIGS. 7 and 8.

FIGS. 7 and 8 are conceptual views that schematically show the outline of another example of the firing jig disassembling apparatuses in accordance with embodiments of the present invention respectively. Here, FIGS. 7 and 8 show firing jig disassembling apparatuses in accordance with embodiments of the present invention, which disassemble firing jigs that have been transported in a piled state with multiple stages.

A firing jig disassembling apparatus 231 shown in FIG. 7 includes robot arms 233 to 237 and jig disassembling belt conveyors 232A, 232B that function as conveyors for placing thereon the firing jig 100 which has the ceramic fired body 13 being mounted thereon and to which the lid member 103 is attached.

This firing jig disassembling apparatus 231 also automatically carries out processes for detaching the lid member 103 attached in a manner so as to cover the firing jig 100, comprised of the sidewall member 102 and the bottom member 101 and with the ceramic fired body being mounted thereon. Here, the firing jig 100 has already been explained.

Moreover, in the firing jig disassembling apparatus 231, the robot arms 233 to 235 and 237 respectively have the same structures as the robot arms 134 to 135 and 137 that include the firing jig disassembling apparatus 131.

In the firing jig disassembling apparatus 231, first, the firing jigs 100, which has ceramic fired bodies 13 being mounted thereon and have been transported from the outside in a piled state in multiple stages, are placed on the jig disassembling belt conveyor 232A.

On the jig disassembling belt conveyor 232A, first, the lid member 103 is detached from the firing jigs 100 by a robot arm 235, and the lid member 103 thus detached is transported to outside by the conveyor 244.

Therefore, in the firing jig disassembling apparatus 231, the robot arm 235 functions as a lid member detaching mechanism. Here, during this operation, the jig disassembling belt conveyor 232A is stopped.

Next, after having been moved by a predetermined distance, the jig disassembling belt conveyor 232A is again stopped, and the firing jigs 100 piled up in multiple stages are successively shifted onto the jig disassembling belt conveyor 232B by the robot arm 236 starting from the firing jig 100 located on the uppermost stage. In this case, the jig disassembling belt conveyor 232B moves intermittently. Therefore, in the firing jig disassembling apparatus 231, the robot arm 236 functions as a jig taking-out mechanism.

Here, the robot arm 236 has the same structure as the robot arm 133 that includes the firing jig disassembling apparatus 131.

In this case, upon shifting the firing jigs 100 one by one from the firing jigs 100 piled up in multiple stages, the shifting process is successively carried out starting from the firing jig 100 located on the uppermost stage; however, in the firing jig disassembling apparatus in accordance with the embodiment of the present invention, it is not necessarily required to start the shifting process from the firing jig 100 located on the uppermost stage, and, for example, the shifting process may be carried out successively starting from the firing jig 100 located on the lowermost stage. In this case, robot arms having the same structures as the robot arms 316A, 316B shown in FIG. 4 may be used.

Next, after the jig disassembling belt conveyor 232B has been moved by a predetermined distance, and in this case, the robot arm 234 detaches the sidewall member 102 from the firing jig 100 with the ceramic fired body 13 being mounted thereon, and places the detached sidewall member 102 onto the conveyor 246 so that the detached sidewall member 102 is transported to outside.

Moreover, after the jig disassembling belt conveyor 232B has been moved by a predetermined distance, the ceramic fired body 13 mounted on the bottom member 101 is then shifted onto a fired body carry-out conveyor 239 by a robot arm 237 so that the ceramic fired body 13 is transported to an apparatus used in the next process by this fired body carry-out conveyor 239.

In this case, in the same manner as the firing jig disassembling apparatus 131 that has already been explained, in place of the robot arm 237, a robot arm which can simultaneously grasp or suction-hold a plurality of ceramic fired bodies 13 may be used.

Next, after the jig disassembling belt conveyor 232B has been moved by a predetermined distance, the bottom member 101 is shifted onto a conveyor 245 by a robot arm 233 so that the bottom member 101 is transported to outside by this conveyor 245.

In the firing jig disassembling apparatus 231 in the mode as shown in FIG. 7, the fired body carry-out conveyor 239 and the conveyors 244 to 246 including this firing jig disassembling apparatus may be, for example, a belt conveyor, a chain conveyor, a roller conveyor, a pallet conveyor and the like.

Moreover, in the firing jig disassembling apparatus 231, the jig disassembling belt conveyors 232A, 232B are conveyors that moves intermittently, and upon stopping of the jig disassembling belt conveyors 232A, 232B, it is desirable for the conveyors to shift from a moving state at a moving speed of about 1.5 m/min or less to the stopped state.

In the case where the moving speed of the conveyors immediately before the shift to the stopped state is about 1.5 m/min or less, upon stopping, it becomes difficult for the ceramic molded body 13 to move on the bottom member 101 due to force of inertia.

If it is difficult for the ceramic molded bodies 13 to move on the bottom member 101, it becomes difficult for the ceramic molded bodies 13 to be mutually made in contact with one another when moved, or for the ceramic fired bodies 13 to come into contact with the sidewall member 102, to cause damages to the ceramic molded bodies 13.

Moreover, upon shifting from the moving state at a moving speed of about 1.5/min or less to the stopped state, the conveyor may shift from the moving state to the stopped state instantaneously, or the conveyor may shift from the moving speed to the stopped state by reducing the moving speed gradually.

Therefore, when the ceramic fired bodies 13 mounted on the bottom member 101 are transported at a speed more than about 1.5 m/min, the moving speed is desirably reduced to a speed of about 1.5 m/min or less once, prior to the stoppage, and then reached to the stopped state.

Moreover, in the firing jig disassembling apparatus in accordance with the embodiment of the present invention having the structure shown in FIG. 7, the number of robot arms is not particularly limited to five, and may be less than five or more than five, and in a case where the number of robot arms is less than five, one robot arm is allowed to have a plurality of functions.

The firing jig disassembling apparatus in accordance with the embodiment of the present invention may have a structure as shown in FIG. 8.

A firing jig disassembling apparatus 331 shown in FIG. 8 includes robot arms 333 to 337 and jig disassembling pallet conveyors 332A, 332B that function as conveyors for placing thereon the firing jig 100, which has the ceramic fired body 13 being mounted thereon and to which the lid member 103 is attached.

This firing jig disassembling apparatus 331 also automatically carries out processes for detaching the lid member 103 attached in a manner so as to cover the firing jig 100, comprised of the sidewall member 102 and the bottom member 101 with the ceramic fired body being placed thereon. Here, the firing jig 100 has already been explained.

Here, the firing jig disassembling apparatus 331 has the same structure as the firing jig disassembling apparatus 231 shown in FIG. 7 except that the jig disassembling pallet conveyors 332A, 332B are installed in place of the jig disassembling belt conveyors 232A, 232B. Therefore, the robot arms 333 to 337 respectively have the same structures as the robot arms 233 to 237.

In the firing jig disassembling apparatus 331, first, the firing jigs 100, which has ceramic fired bodies 13 being mounted thereon and have been transported from the outside in a piled state in multiple stages, are placed on a pallet 332*a* of the jig disassembling pallet conveyor 332A.

On the jig disassembling pallet conveyor 332A, first, the lid member 103 is detached from the firing jigs 100 by a robot arm 335, and the lid member 103 thus detached is transported to outside by a conveyor 344.

Therefore, in the firing jig disassembling apparatus 331, the robot arm 335 functions as a lid member detaching mechanism. Here, during this operation, the jig disassembling pallet conveyor 332A is stopped.

Next, after having been moved by a predetermined distance, the jig disassembling pallet conveyor 332A is stopped, and the firing jigs 100 piled up in multiple stages are successively shifted onto the jig disassembling pallet conveyor 332B by a robot arm 336 starting from the firing jig 100 located on the uppermost stage. In this case, the jig disassembling pallet conveyor 332B is moved intermittently. Therefore, in the firing jig disassembling apparatus 331, the robot arm 336 functions as a jig taking-out mechanism.

In this case, upon shifting the firing jigs 100 one by one from the piled firing jigs 100 in multiple stages, the shifting process is successively carried out starting from the firing jig

100 located on the uppermost stage; however, it is not necessarily required to start the shifting process from the firing jig 100 located on the uppermost stage, and, for example, the shifting process may be carried out successively starting from the firing jig 100 located on the lowermost stage.

Next, after the jig disassembling pallet conveyor 332B has been moved by a predetermined distance, and in this case, the robot arm 334 detaches the sidewall member 102 from the firing jig 100 with the ceramic fired body 13 being mounted thereon, and places the detached sidewall member 102 onto the conveyor 346 so that the detached sidewall member 102 is transported to outside.

Moreover, after the jig disassembling pallet conveyor 332B has been moved by a predetermined distance, the ceramic fired body 13 placed on the bottom member 101 is then shifted onto a fired body carry-out conveyor 339 by a robot arm 337 so that the ceramic fired body 13 is transported to an apparatus used in the next process by this fired body carry-out conveyor 339.

Next, after the jig disassembling pallet conveyor 332B has been moved by a predetermined distance, the bottom member 101 is shifted onto a conveyor 345 by a robot arm 333 so that the bottom member 101 is transported to outside by this conveyor 345.

In the firing jig disassembling apparatus 331 in the mode as shown in FIG. 8, the fired body carry-out conveyor 339 and the conveyors 344 to 346 including this firing jig disassembling apparatus may include, for example, a belt conveyor, a chain conveyor, a roller conveyor, a pallet conveyor and the like.

Moreover, in the firing jig disassembling apparatus 331 shown in FIG. 8 also, upon stopping of the jig disassembling pallet conveyors 332A, 332B that are intermittently moved, it is desirable for the conveyors to shift from a moving state at a moving speed of about 1.5 m/min or less to the stopped state.

In the firing jig disassembling apparatus in accordance with the embodiment of the present invention having the structure shown in FIG. 8, the number of robot arms is not particularly limited to five, and may be less than five or more than five. In a case where the number of robot arms is less than five, one robot arm is allowed to have a plurality of functions.

Moreover, the firing jig disassembling apparatus in accordance with the embodiment of the present invention may be provided with, although not particularly shown in the drawings, for example, a table that is allowed to move through rails and the like in place of the jig disassembling pallet conveyor of the firing jig disassembling apparatus in accordance with the embodiment of the present invention having the structure shown in FIG. 8.

In this case, since the table is allowed to move in the same manner as the pallet of the jig disassembling pallet conveyor, it becomes easier for the lid member to be detached on the table.

Moreover, in the firing jig disassembling apparatus 331 shown in FIG. 8, upon switching the shifting state and the stopped state of the jig disassembling pallet conveyors 332A, 332B with pallets that are moved intermittently, it is desirable to switch the states by gradually reducing or increasing the moving speed.

Figure 9:
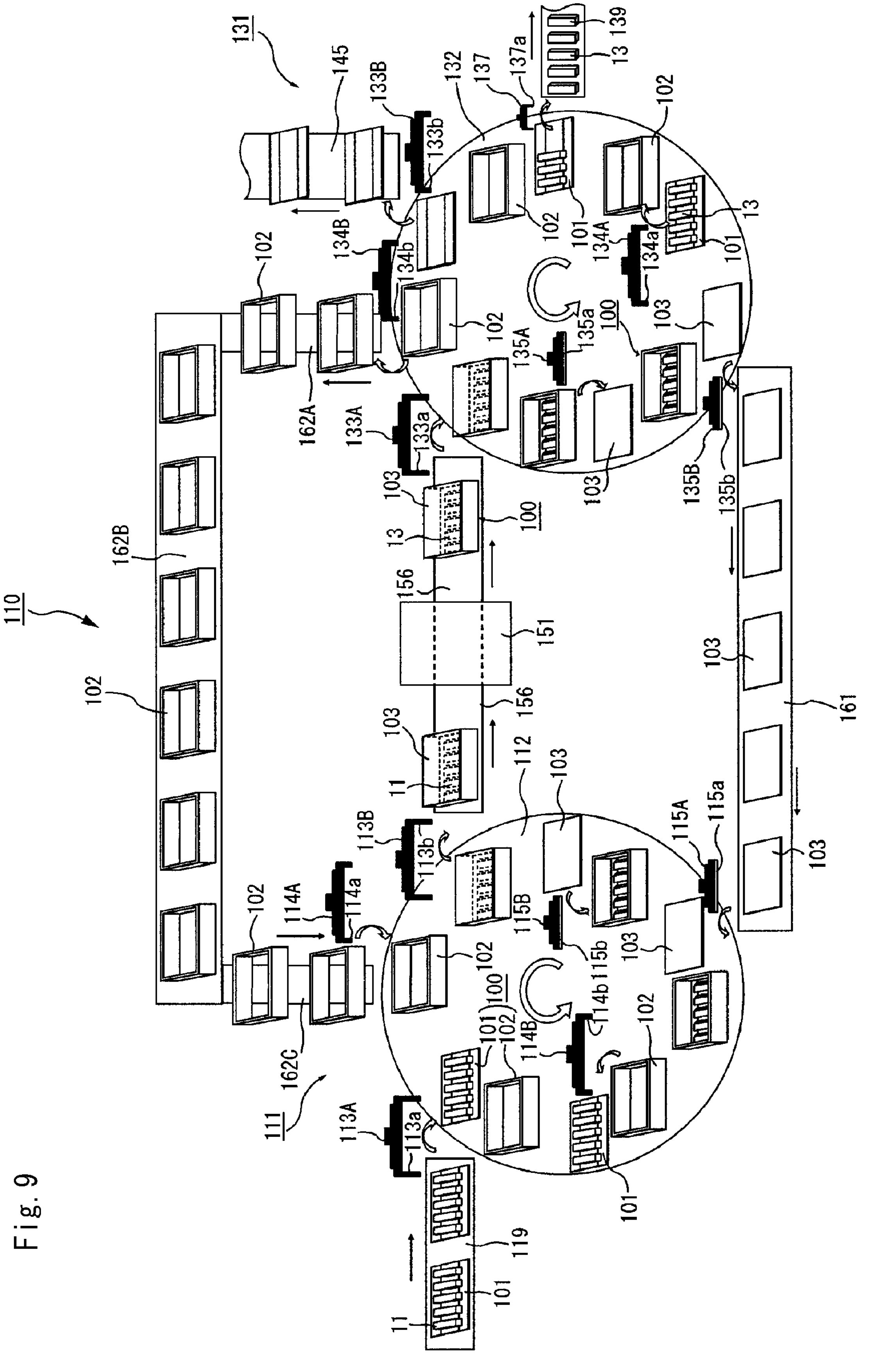
FIG. 9 is a conceptual view that schematically shows one example of a circulating apparatus in accordance with one embodiment of the present invention.

Referring to FIG. 9, the following description will discuss the circulating apparatus in accordance with the embodiment of the present invention.

FIG. 9 is a conceptual view that schematically shows one example of the circulating apparatus in accordance with the embodiment of the present invention.

The circulating apparatus 110 includes: a firing jig assembling apparatus 111, a firing furnace 151, a firing jig disassembling apparatus 131, a lid member transporting conveyor 161 and sidewall member transporting conveyors 162A to 162C.

With respect to the firing jig assembling apparatus 111 and the firing jig disassembling apparatus 131, the firing jig assembling apparatus 111 (see FIG. 1) and the firing jig disassembling apparatus 131 (see FIG. 6) of the present invention, which have already been explained, can be used respectively; therefore, the detailed description thereof is omitted.

In this case, the circulating apparatus 110 will be explained in accordance with the flow of the ceramic molded body 11.

In the circulating apparatus 110 in accordance with the embodiment of the present invention, first, the firing jig assembling apparatus 111 is used for attaching the lid member 103 to the firing jig 100 that is comprised of a sidewall member 102 transported by a sidewall transporting conveyor 162C (conveyor 125 in FIG. 1) and a bottom member 101 transported by a bottom member transporting conveyor 119, in a manner so as to cover the firing jig 100.

The firing jig 100 on which the ceramic molded bodies 11 have been mounted and to which the lid member 103 has been attached is placed on an inter-furnace transporting conveyor 156 (conveyor 123 in FIG. 1) of the firing furnace 151 by the robot arm 113B, and after having been fired in the firing furnace 151 at a predetermined temperature, the firing jig 100 is further transported to the firing jig disassembling device 131 by the inter-furnace transporting conveyor 156 (conveyor 143 in FIG. 1).

Here, in the circulating apparatus 110, the robot arm 113B functions as a jig delivering mechanism.

Next, the firing jig 100 on which the ceramic molded bodies 11 (ceramic fired bodies 13) that have been fired are mounted is moved to the firing jig disassembling apparatus 131 by the robot arm 133A, and the lid member 103 attached to the firing jig 100 is then detached, and the ceramic fired bodies 13 are taken out. The ceramic fired bodies 13 are moved onto a conveyor 139 by the robot arm 137, and transported to an apparatus used in the next process by this conveyor.

Moreover, the lid member 103 is placed on the lid member transporting conveyor 161 (conveyor 144 in FIG. 6, conveyor 124 in FIG. 1) by the robot arm 135B, and returned to the firing jig assembling apparatus 111 by the lid member transporting conveyor 161.

In the circulating apparatus 110, the robot arm 133A functions as a jig receiving mechanism.

In the firing jig disassembling apparatus 131 of the circulating apparatus 110, the sidewall member 102, detached from the bottom member 101, is also returned to the firing jig assembling apparatus 111. As shown in FIG. 9, the sidewall member 102 is returned to the firing jig assembling apparatus 111 through the sidewall member transporting conveyors 162A to 162C.

Here, although not particularly shown in the drawings, after the honeycomb fired bodies 13 have been taken out, the bottom member 101 may be transported to a degreasing apparatus by a conveyor.

Moreover, the firing furnace 151 including the circulating apparatus 110, not particularly limited, conventionally-known firing furnaces may be used. Here, the above-mentioned firing furnace may be a continuous furnace or a batch furnace; however, from the viewpoint of improving the work efficiency and easiness in applicability to an automatic system, a continuous furnace is desirably used.

Specific examples of the conveyors to be installed in the firing furnace include a belt conveyor, a chain conveyor, a roller conveyor, a pallet conveyor and the like.

Moreover, in the circulating apparatus 110, the lid member transporting conveyor 161 used for circulating the lid member 103 and the sidewall member transporting conveyors 162A to 162C used for circulating the sidewall member 102 are composed separately; however, in the circulating apparatus 110, the lid member 103 and the sidewall member 102 may be transported from the firing jig disassembling apparatus 131 to the firing jig assembling apparatus 111 by using the same conveyor.

Moreover, with respect to these conveyors, in order to improve the transporting efficiency, a part or all of the sidewall member transporting conveyor may be designed to have a plurality of stages of two stages or more.

Specific examples of the lid member transporting conveyor 161 and the sidewall member transporting conveyors 162A to 162C, conveyors include a belt conveyor, a chain conveyor, a roller conveyor, a pallet conveyor and the like.

Figure 10:
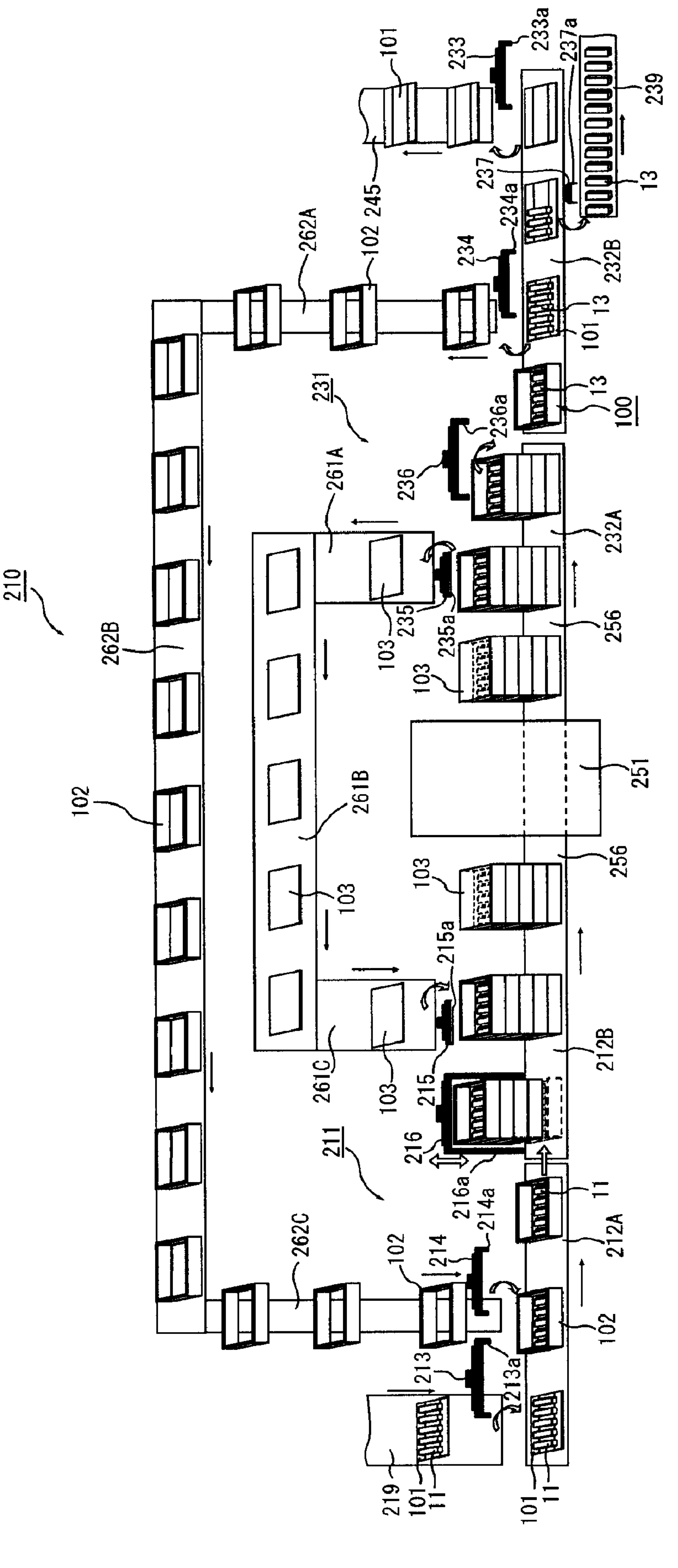
FIG. 10 is a conceptual view that schematically shows the outline of another example of the circulating apparatus in accordance with one embodiment of the present invention.

Moreover, the structure of the circulating apparatus in accordance with the embodiment of the present invention may be a structure as shown in FIG. 10, not limited to the structure shown in FIG. 9, that is, the structure including the firing jig assembling apparatus having a rotation table and the firing jig disassembling apparatus having a rotation table, for example.

FIG. 10 is a conceptual view that schematically shows the outline of another example of the circulating apparatus in accordance with the embodiment of the present invention.

In the circulating apparatus in accordance with the embodiment of the present invention shown in FIG. 10, a firing process can be carried out with firing jigs being in a piled state in multiple stages.

A circulating apparatus 210 shown in FIG. 10 includes: a firing jig assembling apparatus 211 (see FIG. 3), a firing furnace 251, a firing jig disassembling apparatus 231 (see FIG. 7), lid member transporting conveyors 261A to 261C and sidewall member transporting conveyors 262A to 262C.

In the circulating apparatus 210, the firing jig assembling apparatus 211 piles up firing jigs 100, each of which is comprised of a sidewall member 102 transported by a sidewall transporting conveyor 262C (conveyor 225 in FIG. 3) and a bottom member 101 transported by a bottom member transporting conveyor 219, on jig assembling belt conveyors 212A, 212B, in multiple stages, and attaches a lid member 103 in a manner so as to cover the firing jigs 100 piled up in multiple stages.

Next, the firing jigs 100, which have been piled up in multiple stages and to which the lid member 103 is attached, are transported to the firing furnace 251 by the jig assembling belt conveyor 212B, and after a firing process has been carried out at a predetermined temperature in the firing furnace 251, the firing jigs are transported to the firing jig disassembling apparatus 231 by an inter-furnace transporting conveyor 256.

Here, in the circulating apparatus 210, the jig assembling belt conveyor 212B and the inter-furnace transporting conveyor 256 are integrally formed. However, the two conveyors are not necessarily required to be integrally formed, and these may be configured to switch and load the firing jigs from the jig assembling belt conveyor 212B to the inter-furnace transporting conveyor 256.

In the circulating apparatus 210, the jig assembling belt conveyor 212B functions as a jig delivering mechanism.

Next, the firing jigs 100 with the fired ceramic molded bodies 11 (ceramic fired bodies 13) being mounted thereon are transported to the firing jig disassembling apparatus 231, and first, the lid member 103 attached to the firing jigs 100 is detached, and the firing jigs 100 are placed on the jig disassembling belt conveyor 232B stage by stage, and the ceramic fired bodies 13 are then taken out. The ceramic fired bodies 13 are moved onto a fired body transporting conveyor 239 by the robot arm 237, and transported to an apparatus used in the next process by this conveyor.

In the circulating apparatus 210, the jig disassembling belt conveyor 232A and the inter-furnace transporting conveyor 256 are integrally formed. However, the two conveyors are not necessarily required to be integrally formed, and these may be designed to switch and load the firing jigs from the inter-furnace transporting conveyor 256 to the jig disassembling belt conveyor 232A.

In the circulating apparatus 210, the jig disassembling belt conveyor 232A functions as a jig receiving mechanism.

Moreover, the lid member 103 is placed on the lid member transporting conveyor 261A (conveyor 244 in FIG. 7) by the robot arm 235, and returned to the firing jig assembling apparatus 211 through the lid member transporting conveyors 261B, 261C (conveyor 224 in FIG. 3).

In the circulating apparatus 210, the sidewall member 102, detached from the bottom member 101 in the firing jig disassembling apparatus 231, is also returned to the firing jig assembling apparatus 211. As shown in FIG. 10, the sidewall member 102 is returned to the firing jig assembling apparatus 211 through the sidewall member transporting conveyors 262A to 262C.

Here, although not particularly shown in the drawings, after the ceramic fired bodies 13 have been taken out, the bottom member 101 may be transported to a degreasing apparatus by a conveyor.

The structures of the firing furnace, the lid member transporting conveyor and the sidewall member transporting conveyor that include the circulating apparatus 210 are the same as those structures of the firing furnace, the lid member transporting conveyor and the sidewall member transporting conveyor that include the circulating apparatus 110.

Not limited to the structure as shown in FIGS. 9 and 10, the circulating apparatus in accordance with the embodiment of the present invention may have a structure in which: for example, in the circulating apparatus in accordance with the embodiment of the present invention shown in FIG. 10, the firing jig assembling apparatus 311 shown in FIG. 4 is provided as the firing jig assembling apparatus, and the firing jig disassembling apparatus 331 shown in FIG. 8 is provided as the firing jig disassembling apparatus.

In the circulating apparatus in accordance with the embodiment of the present invention described above, the embodiment of the firing jig assembling apparatus and the embodiment of the firing jig disassembling apparatus that include the embodiment of the above-mentioned circulating apparatus include tables or conveyors having respectively the same modes; however, the embodiment of the above-mentioned circulating apparatus may be comprised of the embodiment of the firing jig assembling apparatus and the embodiment of the firing jig disassembling apparatus that include tables or conveyors having respectively different modes.

In other words, the circulating apparatus in accordance with the embodiment of the present invention may be comprised of the embodiment of a firing jig assembling apparatus having a rotation table and the embodiment of a firing jig disassembling apparatus having a jig disassembling belt conveyor, or may be comprised of the embodiment of a firing jig assembling apparatus having a jig assembling belt conveyor and the embodiment of a firing jig disassembling apparatus having a jig disassembling pallet conveyor.

The circulating apparatus in accordance with the embodiment of the present invention may have a structure in which the lid member transporting conveyor, the sidewall member transporting conveyor and the bottom member transporting conveyor are respectively provided as separate transporting conveyors, or a structure in which one or two transporting conveyors transports the lid member, the sidewall member and the bottom member.

Moreover, in the embodiment of the above-mentioned circulating apparatus, at least one of the lid member, the sidewall member and the bottom member may be circulated by a transporting conveyor, while the rest of these members may be stored. Here, upon circulating the sidewall member and the bottom member, these members may be circulated as a firing jig with the sidewall member being attached to the bottom member.

Here, the firing jig may have a structure in which the sidewall member and the bottom member can be separated from each other, or an integral structure between these members, or a structure in which the lid member is formed into a shape with the sidewall member.

In this case, such an integral jig and such a lid member formed into a shape with the sidewall member may be circulated by transporting conveyors.

The following description will discuss a method for firing a ceramic molded body in accordance with the embodiment of the present invention.

In the method for firing a ceramic molded body in accordance with the embodiment of the present invention, the firing process of the ceramic molded body is carried out by using a circulating apparatus. With respect to the circulating apparatus, the aforementioned circulating apparatus in accordance with the embodiment of the present invention is desirably used.

The following description will discuss desired firing conditions and the like by exemplifying a case using a pillar-shaped honeycomb molded body having a large number of cells longitudinally placed in parallel with one another with a cell wall therebetween as the ceramic molded body to be fired.

Of course, the object to be fired in the firing method of the ceramic molded body in accordance with the embodiment of the present invention may be, not limited to the honeycomb molded body, various ceramic molded bodies.

In the present specification, a honeycomb molded body which has been fired is referred to as a fired honeycomb molded body.

In the firing method of the ceramic molded body in accordance with the embodiment of the present invention, first, a firing jig with a honeycomb molded body being mounted thereon is carried into a firing jig assembling apparatus, and a lid member is attached to the firing jig in this firing jig assembling apparatus.

With respect to the method for attaching the lid member to the firing jig in the firing jig assembling apparatus, the same method as explained in the description of the firing jig assembling apparatus in accordance with the embodiment of the present invention is used; therefore, the explanation thereof is omitted.

Next, the honeycomb molded bodies placed on the firing jig are carried into a firing furnace and a firing treatment is carried out therein.

Specific firing conditions are not generally determined since they are changed depending on the size, shape and the like of the honeycomb molded body; however, for example, in the case where the honeycomb molded body has a size of 34 mm×34 mm×15 to 40 mm, desirably, the honeycomb molded bodies are placed with an interval of at least about 5 mm and at most about 8 mm, and a firing process is carried out at a temperature of at least about 1400° C. and at most about 2300° C. for a time period of at least about 5 hours and at most about 20 hours.

Next, the firing jig on which the honeycomb fired bodies are mounted is transported to the firing jig disassembling apparatus where the lid member is detached from the firing jig on which the honeycomb fired bodies are mounted so that the honeycomb fired bodies are taken out of the firing jig.

With respect to the method for detaching the lid member from the firing jig in the firing jig disassembling apparatus, the same method as explained in the description of the firing jig disassembling apparatus in accordance with the embodiment of the present invention is used; therefore, the explanation thereof is omitted.

Here, the lid member, detached in the firing jig disassembling apparatus, is returned to the firing jig assembling apparatus through the lid member transporting conveyor.

Thus, the lid member can be used repeatedly.

With respect to the structure of the lid member transporting conveyor, the explanation has already been given in the description of the circulating apparatus in accordance with the embodiment of the present invention; therefore, the explanation is omitted.

Moreover, the bottom member of the firing jig to be used in the firing method of the ceramic molded body in accordance with the embodiment of the present invention is desirably configured to be also used as a degreasing jig.

Prior to the firing process, normally, a degreasing process is carried out on the honeycomb molded body, and since the honeycomb molded body that has been already degreased is fragile and easily damaged, it is not desirable to grasp the degreased honeycomb molded body so as to move it to the firing jig after the degreasing process.

Therefore, desirably, a degreasing process is carried out on the honeycomb molded body, preliminarily mounted on the bottom member including the firing jig, and upon completion of the degreasing process, a sidewall member is attached to the bottom member with the honeycomb molded body thus degreased being mounted thereon, so as to form a firing jig.

In the method for firing a ceramic molded body in accordance with the embodiment of the present invention having the above-mentioned arrangement, since the firing jig assembling apparatus, the firing furnace, the firing jig disassembling apparatus and the transporting conveyors are provided, it becomes easier to automatically carry out a sequence of firing processes and consequently it becomes easier to fire the ceramic molded body efficiently without the need for manual labor.

The following description will discuss a method for manufacturing a honeycomb structure in accordance with the embodiment of the present invention.

The honeycomb structure to be manufactured by the manufacturing method of the honeycomb structure in accordance with the embodiment of the present invention may be any structural body as long as it is comprised of a honeycomb fired body which is formed by sintering a honeycomb molded body having a large number of cells longitudinally placed in parallel with one another with a cell wall therebetween. Therefore, the honeycomb structure may be formed by firing pillar-shaped honeycomb molded bodies each having a large number of cells longitudinally placed in parallel with one another with a cell wall therebetween, and by combining a plurality of the resulting honeycomb fired bodies combined with one another by interposing sealing material layers (adhesive layers) (see FIG. 11), or may be a pillar-shaped honeycomb structure including a single honeycomb fired body obtained by firing a honeycomb molded body having a large number of cells longitudinally placed in parallel with one another with a cell wall therebetween. In the present specification, the former honeycomb structure in which a plurality of honeycomb fired bodies are bound to one another by interposing sealing material layers (adhesive layers) is referred to as an aggregated honeycomb structure, and the latter pillar-shaped honeycomb structure including a single honeycomb fired body is referred to as an integral honeycomb structure.

Figure 11:
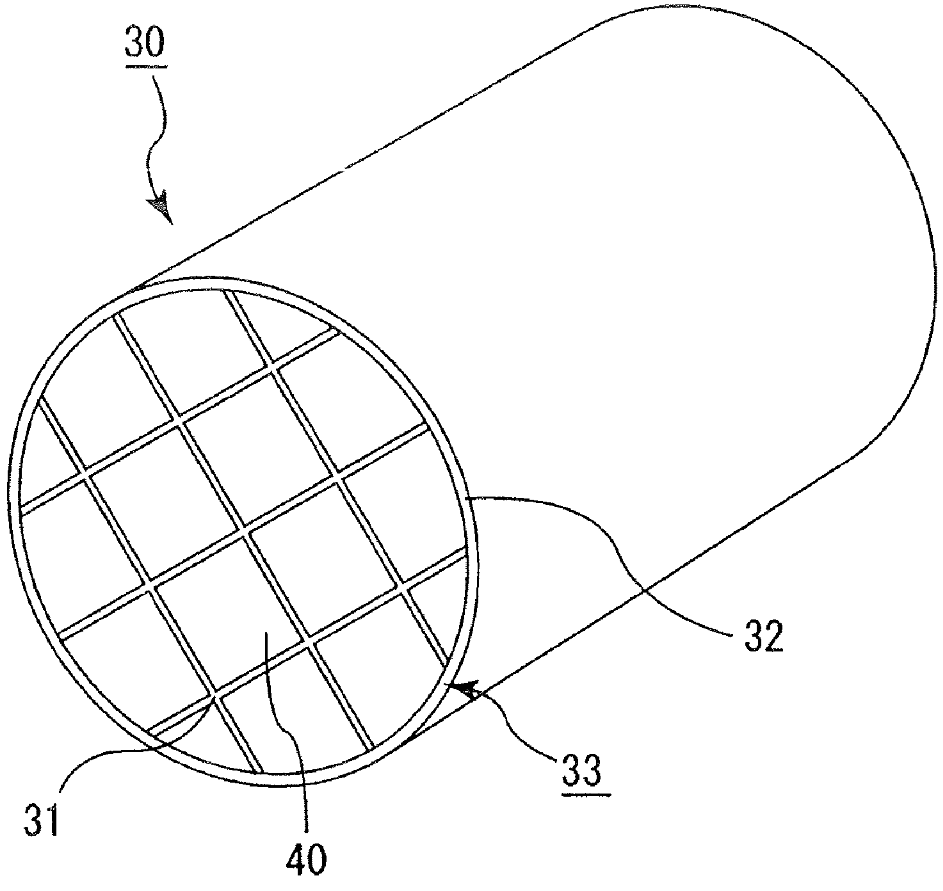
FIG. 11 is a perspective view that schematically shows one example of a honeycomb structure.
Figure 12A:
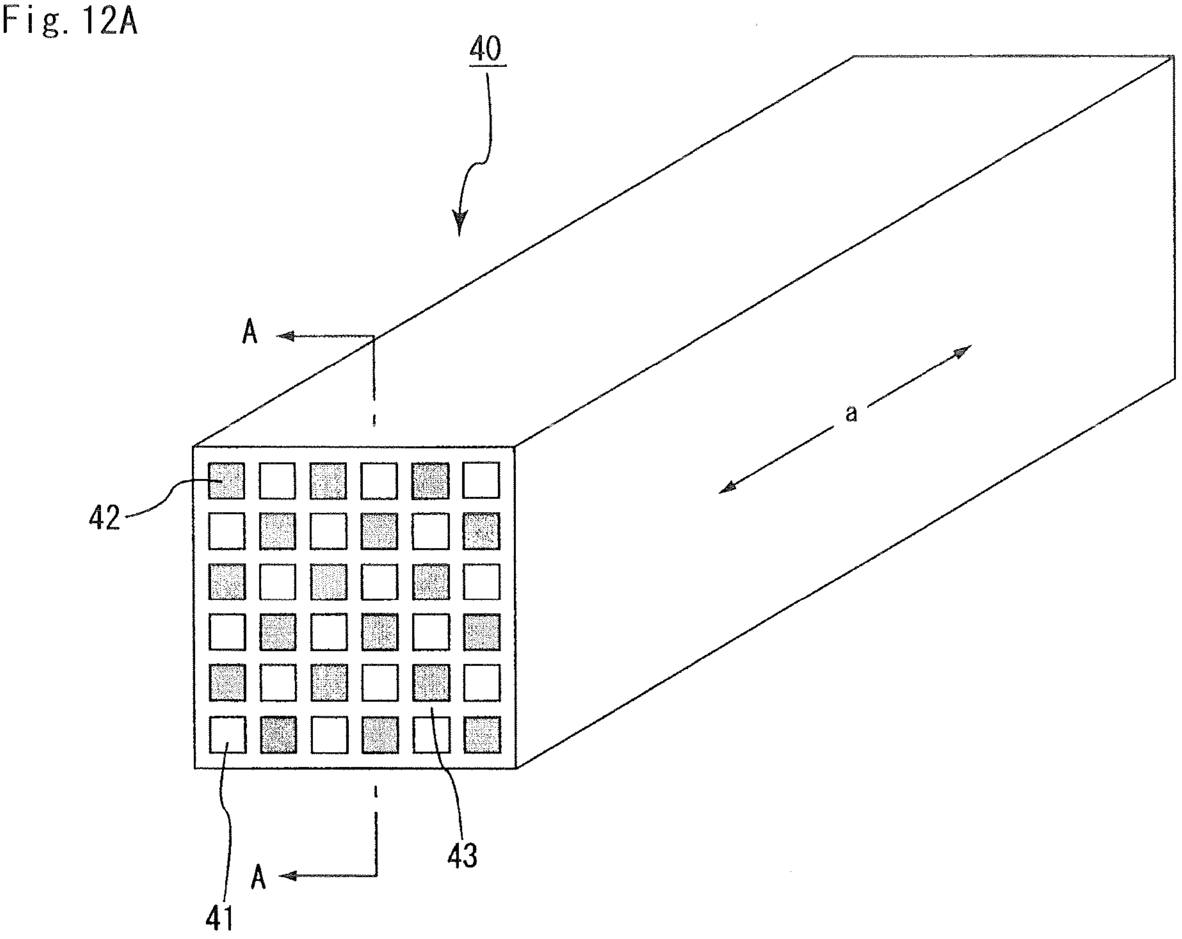
FIG. 12A is a perspective view that schematically shows a honeycomb fired body for forming the honeycomb structure.
Figure 12B:
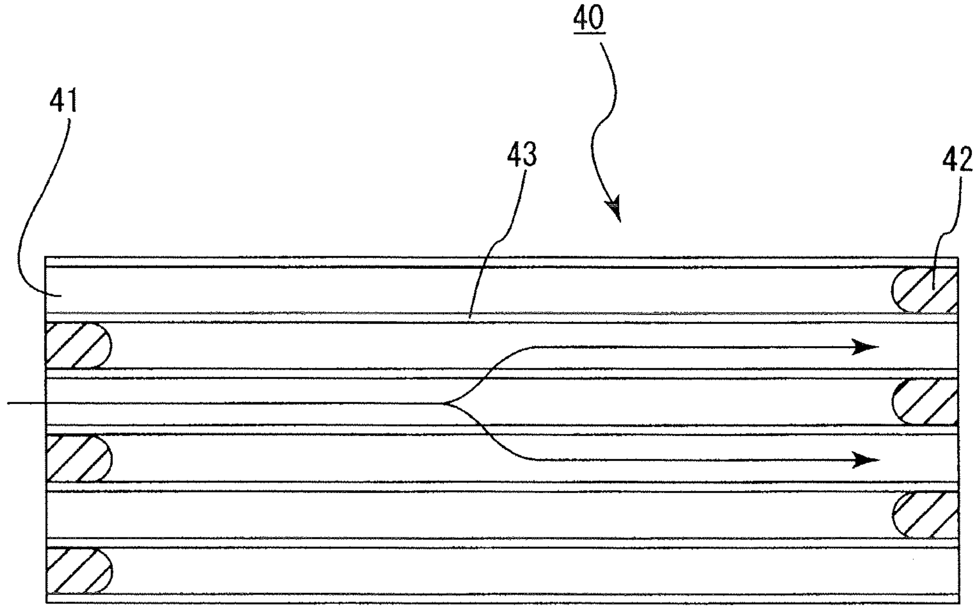
FIG. 12B is a cross-sectional view taken along line A-A of FIG. 12A.

FIG. 11 is a perspective view that schematically shows one example of a honeycomb structure, FIG. 12A is a perspective view that schematically shows a honeycomb fired body for forming the honeycomb structure, and FIG. 12B is a cross-sectional view taken along line A-A of FIG. 12A.

In the honeycomb structure 30, a plurality of honeycomb fired bodies 40 shown in FIG. 12A are bound to one another by interposing sealing material layers (adhesive layers) 31 to form a honeycomb block 33, and a sealing material layer (coat layer) 32 is further formed on the outer periphery of this honeycomb block 33.

Moreover, as shown in FIGS. 12A and 12B, the honeycomb fired body 40 has a large number of cells 41 longitudinally placed in parallel with one another (see "a" in FIG. 12A) so that each cell wall 43 that separates the cells 41 is allowed to function as a filter.

In other words, as shown in FIG. 12B, each of the cells 41, formed in the honeycomb fired body 40, is sealed with a plug material layer 42 at either one of ends on its exhaust gas inlet side and exhaust gas outlet side. Therefore, exhaust gases that have entered one cell 41 are discharged from another cell 41 after having always passed through each cell wall 43 that separates the cells 41; thus, when exhaust gases pass through the cell wall 43, particulates are captured by the cell wall 43 so that the exhaust gases are purified.

With respect to the main component of a material for the honeycomb structure to be manufactured by the manufacturing method of the honeycomb structure in accordance with the embodiment of the present invention, examples thereof include: nitride ceramic materials such as aluminum nitride, silicon nitride, boron nitride and titanium nitride, carbide ceramic materials such as silicon carbide, zirconium carbide, titanium carbide, tantalum carbide and tungsten carbide, and oxide ceramic materials such as alumina, zirconia, cordierite, mullite, and aluminum titanate, and the like. Among these, powder of silicon carbide that has a high heat resistant property, superior mechanical properties and a high thermal conductivity is desirably used. Here, materials, such as a silicon-containing ceramic material formed by blending metal silicon in the above-mentioned ceramic material and a ceramic material that is combined by silicon or a silicate compound, may also be used, and for example, a material in which metal silicon is blended in silicon carbide is desirably used.

The following description will discuss the method for manufacturing a honeycomb structure in accordance with the embodiment of the present invention by exemplifying the method for manufacturing a honeycomb structure mainly composed of silicon carbide, in the order of successive processes.

First, inorganic powder, such as silicon carbide powders having different average particle sizes, and an organic binder are dry-mixed to prepare a mixed powder, and a liquid-state plasticizer, a lubricant and water are mixed to prepare a mixed liquid, and the mixed powder and the mixed liquid are mixed by using a wet-mixing machine so that a wet mixture to be used for molding is prepared.

With respect to the particle size of silicon carbide powder, although not particularly limited, the silicon carbide powder which tends not to cause the case where the size of the honeycomb fired body manufactured by the following firing process becomes smaller than that of the degreased honeycomb molded body is desirable, and for example, mixed powder, prepared by combining 100 parts by weight of powder having an average particle size of at least about 0.3 μm and at most about 50 μm with about 5 parts by weight and at most about 65 parts by weight of powder having an average particle size of at least about 0.1 μm and at most about 1.0 μm, is desirably used.

In order to adjust the pore diameter and the like of the honeycomb fired body, it is necessary to adjust the firing temperature; however, it becomes easier for the pore diameter to be adjusted by adjusting the particle size of the inorganic powder.

With respect to the above-mentioned organic binder, not particularly limited, examples thereof include: methyl cellulose, carboxymethyl cellulose, hydroxyethyl cellulose, polyethylene glycol and the like. Among these, methyl cellulose is more desirably used.

In general, the compounding amount of the above-mentioned binder is desirably set to at least about 1 part by weight and at most about 10 parts by weight with respect to 100 parts by weight of the inorganic powder.

With respect to the above-mentioned plasticizer, not particularly limited, for example, glycerin and the like may be used.

Moreover, with respect to the lubricant, not particularly limited, for example, polyoxyalkylene-based compounds, such as polyoxyethylene alkyl ether and polyoxypropylene alkyl ether, may be used.

Specific examples of the lubricant include: polyoxyethylene monobutyl ether, polyoxypropylene monobutyl ether and the like.

Here, the plasticizer and the lubricant are not necessarily contained in the mixed liquid depending on cases.

Upon preparing the wet mixture, a dispersant solution may be used, and with respect to the dispersant solution, examples thereof include: water, an organic solvent such as benzene, and an alcohol such as methanol, and the like.

Moreover, a molding auxiliary may be added to the wet mixture.

With respect to the molding auxiliary, not particularly limited, examples thereof include: ethylene glycol, dextrin, fatty acid, fatty acid soap, polyalcohol and the like.

Furthermore, a pore forming agent, such as balloons that are fine hollow spheres composed of oxide-based ceramics, spherical acrylic particles, graphite and the like, may be added to the above-mentioned wet mixture, if necessary.

With respect to the above-mentioned balloons, not particularly limited, for example, alumina balloons, glass microballoons, shirasu balloons, fly ash balloons (FA balloons), mullite balloons and the like may be used. Among these, alumina balloons are more desirably used.

Here, with respect to the wet mixture using silicon carbide powder, prepared as described above, the temperature thereof is desirably set to about 28° C. or less. When the temperature is about 28° C. or less, it becomes difficult for the organic binder to be gelated.

Moreover, the rate of organic components in the wet mixture is desirably set to about 10% by weight or less, and the content of moisture is desirably set at least about 8.0% by weight and at most about 20.0% by weight.

Next, the wet mixture is extrusion-molded by an extrusion-molding method or the like. The molded body obtained through the extrusion-molding is cut by a cutting machine so that a honeycomb molded body, which has the same shape as the pillar-shaped honeycomb fired body 40 shown in FIGS. 12A and 12B, and without plugged cells, is manufactured.

Next, a predetermined amount of plug material paste that forms plugs is filled into either one of the ends of each of cells in the honeycomb molded body so that the cells are sealed.

More specifically, upon manufacturing a honeycomb structure that functions as a ceramic filter, either one of the ends of each cell is sealed.

Moreover, prior to the sealing process of the honeycomb molded body, a drying process may be carried out on the honeycomb molded body, if necessary, and in this case, the drying process is carried out by using a drying apparatus, such as a microwave drying apparatus, a hot-air drying apparatus, a reduced-pressure drying apparatus, a dielectric drying apparatus, a freeze drying apparatus and the like.

With respect to the plug material paste, although not particularly limited, those plug material pastes that allow the plugs manufactured through post processes to have a porosity of at least about 30% and at most about 75% are desirably used, and, for example, the same material as that of the wet mixture may be used.

The filling process of the plug material paste can be carried out on demand, and when the plug material paste has been filled thereto, for example, the resulting honeycomb structure obtained through the post process is desirably used as a honeycomb filter, and in the case where no plug material paste has been filled thereto, for example, the honeycomb structure obtained through the post process is desirably used as a catalyst supporting carrier.

Next, on the honeycomb molded body which has the plug material paste filled therein is carried out a degreasing process under predetermined conditions (for example, at a temperature of at least about 200° C. and at most about 500° C. for a time period of at least about 2 hours and at most about 4 hours).

Next, a firing process is carried out by using a circulating apparatus on the honeycomb molded body that has been degreased so that a pillar-shaped honeycomb fired body having a plurality of cells longitudinally placed in parallel with one another with a cell wall therebetween with either one of the ends of each cell being plugged is manufactured.

With respect to the firing method using the circulating apparatus, the same method as the firing method of the honeycomb molded body in accordance with the embodiment of the present invention that has been explained may be used; therefore, the description thereof is omitted.

Here, with respect to the degreasing conditions and firing conditions of the honeycomb molded body, conventionally-used conditions used upon manufacturing a filter made from a porous ceramic material may be adopted.

With respect to the firing jig to be used upon carrying out the firing process, a firing jig comprised of a bottom member and a sidewall member or a firing jig comprised of a molded body placing member and a sidewall member is desirably used, and these bottom member and molded body placing member are also desirably used upon carrying out the degreasing process. The reason for this has already been explained.

Therefore, the bottom member and the molded body placing member of the firing jig to be used in the method for manufacturing a honeycomb structure in accordance with the embodiment of the present invention are desirably configured so as to be also used as the firing jigs.

Referring to the drawings, the following description will discuss these degreasing process and firing process in more detail.

Figure 13:
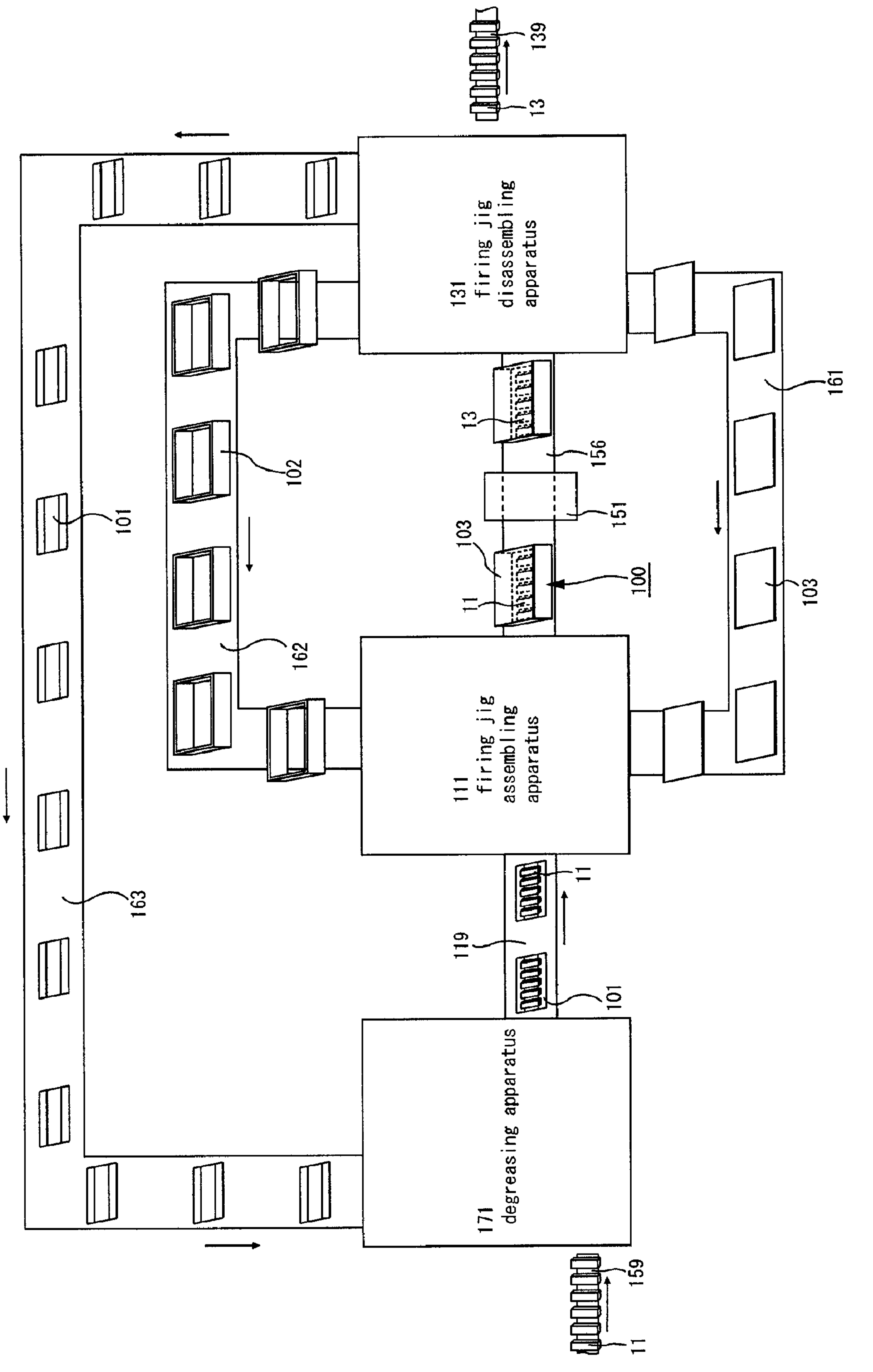
FIG. 13 is an explanatory drawing that schematically shows one example of each of a degreasing process and a firing process in the method for manufacturing a honeycomb structure in accordance with one embodiment of the present invention.

FIG. 13 is an explanatory drawing that schematically shows one example of each of the degreasing process and the firing process in the method for manufacturing a honeycomb structure in accordance with the embodiment of the present invention.

As shown in FIG. 13, in the degreasing process and the firing process of the method for manufacturing a honeycomb structure in accordance with the embodiment of the present invention, a honeycomb molded body 11, transported from the preceding process (for example, the plug material paste filling process) by the molded body carry-in conveyor 159, is first placed on the bottom member 101 in the degreasing apparatus 171.

The honeycomb molded body 11, thus placed on the bottom member 101, is degreased in the degreasing furnace, and further transported to the firing jig assembling apparatus 111 that has already been explained, with the honeycomb molded body 11 being placed on the bottom member 101.

In the firing jig assembling apparatus 111, the sidewall member 102 and the lid member 103 are attached to the bottom member 101 on which the honeycomb molded body is placed, and the firing jig 100, on which the honeycomb molded body 11 has been placed and to which the lid member 103 has been attached, is successively transported to inside of the firing furnace 151 by the inter-furnace transporting conveyor 156.

Moreover, the honeycomb molded body that has been fired in the firing furnace 151, as it is, is transported to the firing jig disassembling apparatus 131 by the inter-furnace transporting conveyor 156, and in the firing jig disassembling apparatus 131, the lid member 103 and the sidewall member 102 are detached, and the honeycomb fired body 13 is then taken out so that the resulting honeycomb fired body 13 is carried out to an apparatus used in the next process by the fired body carry-out conveyor 139.

Here, the lid member 103 and the sidewall member 102, detached from the bottom member 101 in the firing jig disassembling apparatus 131, are returned from the firing jig assembling apparatus 131 to the firing jig assembling apparatus 111 respectively by the lid member transporting conveyor 161 and by the sidewall member transporting conveyor 162.

Moreover, after the honeycomb fired body has been taken out, the bottom member 101 including the firing jig 100 is returned from the firing jig disassembling apparatus 131 to the degreasing apparatus 171 by the conveyor 163.

By carrying out the degreasing process and the firing process in this manner, the firing jig comprised of the bottom member and the sidewall member and the lid member attached in a manner so as to cover the firing jig can be used repeatedly, and since the honeycomb molded body that has been degreased needs not be grasped so as to be shifted, it becomes easier to carry out the degreasing process and the firing process desirably.

In the above description, the degreasing process and the firing process have been explained by exemplifying processes in which the firing jig assembling apparatus 111 shown in FIG. 1 is used as the embodiment of the firing jig assembling apparatus while the firing jig disassembling apparatus 131 shown in FIG. 6 is used as the embodiment of the firing jig disassembling apparatus; however, in the present processes, the firing jig assembling apparatus in accordance with the embodiment of the present invention may be used as the firing jig assembling apparatus while the firing jig disassembling apparatus in accordance with the embodiment of the present invention may be used as the firing jig disassembling apparatus.

Moreover, with respect to the firing jig to be used, not limited to the firing jig (see FIG. 2) comprised of the bottom member and the sidewall member, a firing jig and the like (see FIG. 5) comprised of a molded body placing member and a sidewall member integrally formed on the lower side thereof may be desirably used.

Next, a sealing material paste, which forms a sealing material layer (adhesive layer), is applied onto side faces of the honeycomb fired body with a uniform thickness, and a process for laminating another honeycomb fired body on this sealing material paste layer is successively repeated so that an aggregate of honeycomb fired bodies having a predetermined size is manufactured.

With respect to the sealing material paste, examples thereof include an inorganic binder, an organic binder and a material made from inorganic fibers and/or inorganic particles.

With respect to the inorganic binder, for example, silica sol, alumina and the like may be used. Each of these may be used alone or two or more kinds of these may be used in combination. Among the inorganic binders, silica sol is more desirably used.

With respect to the organic binder, examples thereof include polyvinyl alcohol, methyl cellulose, ethyl cellulose, carboxymethyl cellulose and the like. Each of these may be used alone or two or more kinds of these may be used in combination. Among the organic binders, carboxymethyl cellulose is more desirably used.

With respect to the inorganic fibers, examples thereof include ceramic fibers, such as silica-alumina, mullite, alumina and silica, and the like. Each of these may be used alone or two or more kinds of these may be used in combination. Among the inorganic fibers, alumina fibers are more desirably used.

With respect to the inorganic particles, examples thereof include carbides, nitrides and the like, and specific examples include inorganic powder and the like including silicon carbide, silicon nitride or boron nitride. Each of these may be used alone, or two or more kinds of these may be used in combination. Among the inorganic particles, silicon carbide having superior thermal conductivity is desirably used.

Moreover, a pore forming agent, such as balloons that are fine hollow spheres composed of oxide-based ceramics, spherical acrylic particles and graphite, may be added to the above-mentioned sealing material paste, if necessary.

With respect to the above-mentioned balloons, not particularly limited, for example, alumina balloons, glass microballoons, shirasu balloons, fly ash balloons (FA balloons), mullite balloons and the like may be used. Among these, alumina balloons are more desirably used.

Next, this aggregate of honeycomb fired bodies is heated so that the sealing material paste layers are dried and solidified to form sealing material layers (adhesive layers).

Next, the aggregate of honeycomb fired bodies in which a plurality of honeycomb fired bodies have been bonded to one another by interposing sealing material layers (adhesive layers) is cut and machined by using a diamond cutter and the like so that a cylindrical shaped honeycomb block is manufactured.

Then, a sealing material layer (coat layer) is formed on the periphery of the honeycomb block by using the above-mentioned sealing material paste so that a honeycomb structure in which a sealing material layer (coat layer) is formed on the periphery of a cylindrical honeycomb block having a structure in which a plurality of honeycomb fired bodies are bound to one another by interposing sealing material layers (adhesive layers) is manufactured.

Thereafter, a catalyst is supported on the honeycomb structure on demand. The supporting process of the catalyst may be carried out on the honeycomb fired bodies prior to being formed into an aggregate.

In the case where a catalyst is supported thereon, an alumina film having a high specific surface area is desirably formed on the surface of the honeycomb structure, and a co-catalyst and a catalyst such as platinum are applied onto the surface of the alumina film.

With respect to the method for forming the alumina film on the surface of the honeycomb structure, for example, a method in which the honeycomb structure is impregnated with a solution of a metal compound containing aluminum such as $Al(NO_3)_3$ and then heated, and a method in which the honeycomb structure is impregnated with a solution containing alumina powder and then heated, are proposed.

With respect to the method for applying a co-catalyst to the alumina film, for example, a method in which the honeycomb structure is impregnated with a solution of a metal compound containing a rare-earth element, such as $Ce(NO_3)_3$, and then heated is proposed.

With respect to the method for applying a catalyst to the alumina film, for example, a method in which the honeycomb structure is impregnated with a solution of diamine dinitro platinum nitric acid ($[Pt(NH_3)_2(NO_2)_2]HNO_3$, platinum concentration: about 4.53% by weight) and then heated is proposed.

Moreover, a catalyst may be applied through a method in which after the catalyst has been preliminarily applied to alumina particles, the honeycomb structure is impregnated with a solution containing the alumina powder bearing the catalyst applied thereto, and then heated.

Here, the above-mentioned method for manufacturing a honeycomb structure in accordance with the embodiment of the present invention relates to an aggregated honeycomb structure; however, the honeycomb structure to be manufactured by the manufacturing method of the honeycomb structure in accordance with the embodiment of the present invention may be a honeycomb structure (integral honeycomb structure) in which a pillar-shaped honeycomb block is comprised of single honeycomb fired body.

With respect to the main constituent material of the aggregated honeycomb structure, silicon carbide and a material formed by blending metal silicon in silicon carbide are desirably used, and with respect to the main constituent material of the integral honeycomb structure, cordierite and aluminum titanate are desirably used.

Upon manufacturing such an integral honeycomb structure, first, a honeycomb molded body is manufactured by using the same method as the method for manufacturing an aggregated honeycomb structure except that the size of a honeycomb molded body to be molded through the extrusion-molding process is larger than that of the aggregated honeycomb structure.

Next, in the same manner as the manufacturing processes of the aggregated honeycomb structure, if necessary, the drying process and the filling process of plug material paste are carried out; thereafter, the degreasing and firing processes are carried out in the same manner as the manufacturing processes of the aggregated honeycomb structure to manufacture a honeycomb block, and by forming a sealing material layer (coat layer), if necessary, an integral honeycomb structure can be manufactured. Moreover, a catalyst may be supported on the integral honeycomb structure as well by using the above-mentioned method.

In the method for manufacturing a honeycomb structure in accordance with the embodiment of the present invention as explained above, it is possible to desirably manufacture a honeycomb structure having a desired shape.

Moreover, with respect to the honeycomb structure, the foregoing explanation has been given mainly on a honeycomb filter that is used to collect particulates in exhaust gases; however, the honeycomb structure without sealing of cells may also be desirably used as a catalyst supporting carrier (honeycomb catalyst) that purifies exhaust gases.

EXAMPLES

The following description will discuss the present invention in more detail by means of examples; however, the present invention is not intended to be limited only by these examples.

Example 1

Powder of α-type silicon carbide having an average particle size of 10 μm (250 kg), powder of α-type silicon carbide having an average particle size of 0.5 μm (100 kg) and an organic binder (methyl cellulose) (20 kg) were mixed to prepare a mixed powder.

Next, separately, a lubricant (UNILUB, made by NOF Corp.) (12 kg), a plasticizer (glycerin) (5 kg) and water (65 kg) were mixed to prepare a liquid mixture, and this liquid mixture and the mixed powder were mixed by using a wet-mixing machine so that a wet mixture was prepared.

Next, this wet mixture was transported to an extrusion-molding machine by using a transporting apparatus, and charged into a material charging port of the extrusion-molding machine.

The wet mixture was then extrusion-molded into a molded body having the same shape as shown in FIG. 12A except that ends of the cells had not been plugged.

Next, the honeycomb molded body was dried by using a drying apparatus in which microwaves and hot air were used in combination, and a plug material paste having the same composition as the wet mixture was filled into predetermined cells.

Next, a degreasing process and a firing process were carried out by using a degreasing apparatus and the circulating apparatus 210 according to the embodiment of the present invention (see FIGS. 10 and 13).

Here, the degreasing conditions were set to 400° C. for 3 hours. In this case, the honeycomb molded bodies were placed on a bottom member of the degreasing jig with an interval of 6 mm.

Moreover, the firing conditions were set to 2200° C. for 3 hours under a normal-pressure argon atmosphere.

By using the above-mentioned degreasing and firing processes, a honeycomb fired body including a silicon carbide sintered body, which had a porosity of 40%, an average pore diameter of 12.5 μm, a size of 34.3 mm×34.3 mm×254 mm, the number of cells (cell density) of 46.5/cm$^2$ and a thickness of each cell wall of 0.25 mm, was manufactured.

Here, in the circulating apparatus 210, both of the jig assembling belt conveyors 212A, 212B including the firing jig assembling apparatus 211 and the jig disassembling belt conveyors 232A, 232B including the firing jig disassembling apparatus 231 moved intermittently.

More specifically, upon transportation, each belt conveyor was moved at a moving speed of 3 m/min, and upon shifting from the moving state to the stop state, the moving speed was reduced from 3 m/min to a moving speed (moving speed prior to stoppage) of 0.5 m/min, and each belt conveyor then shifted to stopped state.

By using a heat resistant sealing material paste containing 30% by weight of alumina fibers having an average fiber length of 20 μm, 21% by weight of silicon carbide particles having an average particle diameter of 0.6 μm, 15% by weight of silica sol, 5.6% by weight of carboxymethyl cellulose and 28.4% by weight of water, a large number of the honeycomb fired bodies were bonded to one another, and this was dried at 120° C., and then cut by using a diamond cutter so that a cylindrical honeycomb block having a sealing material layer (adhesive layer) with a thickness of 1 mm was manufactured.

Next, silica-alumina fibers (average fiber length: 100 μm, average fiber diameter: 10 μm) (23.3% by weight), which served as inorganic fibers, silicon carbide powder having an average particle diameter of 0.3 μm (30.2% by weight), which served as inorganic particles, silica sol ($SiO_2$ content in the sol: 30% by weight) (7% by weight), which served as an inorganic binder, carboxymethyl cellulose (0.5% by weight), which served as an organic binder, and water (39% by weight) were mixed and kneaded to prepare a sealing material paste.

Next, a sealing material paste layer having a thickness of 0.2 mm was formed on the peripheral portion of the honeycomb block by using the above-mentioned sealing material paste. Further, this sealing material paste layer was dried at 120° C. so that a cylindrical honeycomb structure having a size of 143.8 mm in diameter×254 mm in length, with a sealing material layer (coat layer) formed on the outer periphery, was manufactured.

By using the method of the present example, a honeycomb structure having a desired shape was manufactured.

Moreover, in the present example, when honeycomb fired bodies manufactured during the manufacturing processes were visually observed (with a magnifying glass of for example 5 magnifications), no honeycomb fired bodies having cracks or the like were found. Here, in the visual observation, the number of samples was set to 300 pieces.

What is claimed as new and desired to be secured by Letters Patent of the United States is:

1. A method for firing a ceramic molded body comprising:

mounting a ceramic molded body on a bottom member;

attaching a sidewall member to said bottom member on which said ceramic molded body is mounted to assemble a firing jig, said firing jig being comprised of said bottom member and said sidewall member; and firing said ceramic molded body by allowing said firing jig which has the ceramic molded body being mounted thereon to pass through the inside of a firing furnace, using a circulating apparatus that comprises:

a firing jig assembling apparatus which includes a robot arm, and a table or a conveyor for placing the firing jig thereon with the ceramic molded body being mounted on said firing jig upon firing the ceramic molded body, a lid member being attached to the firing jig that mounts said ceramic molded body thereon on said table or said conveyor;

the firing furnace used for firing the ceramic molded body mounted on the firing jig;

a firing jig disassembling apparatus which includes a robot arm, and a table or a conveyor for placing thereon a firing jig to which a lid member is attached, with a ceramic molded body being mounted on said firing jig upon firing the ceramic molded body, said lid member attached to said firing jig being detached on said table or said conveyor; and a transporting conveyor that transports by machines at least either one of the lid member that is detached in said firing jig disassembling apparatus and the firing jig from the firing jig disassembling apparatus to said firing jig assembling apparatus, wherein said firing jig assembling apparatus comprises:

a lid member attaching mechanism that attaches said lid member by using said robot arm to a predetermined position of said firing jig placed on said table or said conveyor; and a jig delivering mechanism that delivers the firing jig which has said ceramic molded body being mounted thereon and the lid member being attached thereto, to said firing furnace, said firing jig disassembling apparatus comprising:

a jig receiving mechanism that receives the firing jig which has said fired ceramic molded body being mounted thereon with the lid member being attached thereto, from said firing furnace; and a lid member detaching mechanism that detaches said lid member by using said robot arm from the firing jig placed on said table or said conveyor with the lid member being attached thereto.

2. The method for firing a ceramic molded body according to claim 1, wherein said firing jig assembling apparatus further comprises a jig piling mechanism that piles up a plurality of said firing jigs, each having said ceramic molded body mounted thereon, in multiple stages, and said firing jig disassembling apparatus further comprises a jig taking-out mechanism that takes out a firing jig from said firing jigs piled up in multiple stages.

3. The method for firing a ceramic molded body according to claim 1, wherein said bottom member is usable as a degreasing jig.

4. The method for firing a ceramic molded body according to claim 1, wherein said firing jig assembling apparatus and/or said firing jig disassembling apparatus comprise said conveyor that moves intermittently, and upon stopping of said conveyor, said conveyor shifts from a moving state at a moving speed of about 1.5 m/min or less to a stopped state.

5. The method for firing a ceramic molded body according to claim 1, wherein at least one of said robot arms has a grasping portion, and a groove portion is formed on a bottom face of said bottom member in such a shape that one portion of said grasping portion is fitted to said groove portion.

6. The method for firing a ceramic molded body according to claim 1, wherein said robot arm of said firing jig assembling apparatus moves said bottom member and/or said sidewall member, and attaches said sidewall member to said bottom member.

7. The method for firing a ceramic molded body according to claim 1, wherein said robot arm of said firing jig disassembling apparatus detaches said sidewall member from said firing jig, and moves said sidewall member and/or said bottom member from which said sidewall is detached.

8. The method for firing a ceramic molded body according to claim 1, wherein said firing jig assembling apparatus includes said table, said firing jig disassembling apparatus includes said table, and said table of said firing jig assembling apparatus and/or said table of said firing jig disassembling apparatus is a rotation table or a table allowed to move through rails.

9. The method for firing a ceramic molded body according to claim 1, wherein said robot arm of said firing jig assembling apparatus and said robot arm of said firing jig disassembling apparatus each have has a grasping mechanism and/or a suction mechanism.

10. The method for firing a ceramic molded body according to claim 9, wherein said robot arm of said firing jig assembling apparatus moves said lid member, and/or attaches said lid member to said firing jig with said ceramic molded body being mounted on said firing jig.

11. The method for firing a ceramic molded body according to claim 9, wherein said robot arm of said firing jig disassembling apparatus moves said lid member, and/or detaches said lid member attached to said firing jig with said fired ceramic molded body being mounted on said firing jig.

12. The method for firing a ceramic molded body according to claim 9, wherein said robot arm of said firing jig disassembling apparatus simultaneously grasps and/or suction-holds a plurality of said fired ceramic molded bodies.

13. The method for firing a ceramic molded body according to claim 1, wherein said firing furnace is a continuous furnace.

14. The method for firing a ceramic molded body according to claim 1, wherein said circulating apparatus comprises three transporting conveyors, and said three transporting conveyors transport said lid member, said sidewall member, and said bottom member separately.

15. The method for firing a ceramic molded body according to claim 1, wherein said circulating apparatus comprises two transporting conveyors, one of said two transporting conveyors transports two of three members consisting of said lid member, said sidewall member, and said bottom member, and the other of said two transporting conveyors transports the rest of the three members.

16. The method for firing a ceramic molded body according to claim 1, wherein said circulating apparatus comprises one transporting conveyor, and said one transporting conveyor transports said lid member, said sidewall member, and said bottom member.

17. The method for firing a ceramic molded body according to claim 1, wherein said circulating apparatus has a structure that at least one of three members consisting of said lid member, said sidewall member, and said bottom member, is circulated by said transporting conveyor, while the rest of the three members are stored.

18. The method for firing a ceramic molded body according to claim 1, wherein said circulating apparatus has a structure that said firing jig with said sidewall member being attached to said bottom member is circulated by said transporting conveyor.

19. The method for firing a ceramic molded body according to claim 1, wherein firing is carried out such that said ceramic molded body is mounted on said firing jig, and said firing jigs are in a piled state in multiple stages.

20. A method for manufacturing a honeycomb structure, comprising:

manufacturing a pillar-shaped honeycomb molded body having a large number of cells longitudinally placed in parallel with one another with a cell wall therebetween by molding a ceramic material;

mounting the honeycomb molded body onto a bottom member;

attaching a sidewall member to said bottom member on which the honeycomb molded body is mounted to assemble a firing jig, said firing jig being comprised of said bottom member and said sidewall member; and firing the honeycomb molded body mounted on the firing jig, wherein said firing of the honeycomb molded body is carried out by using a circulating apparatus that comprises:

a firing jig assembling apparatus which includes a robot arm, and a table or a conveyor for placing the firing jig thereon with the honeycomb molded body being mounted on said firing jig upon firing the honeycomb molded body, a lid member being attached to the firing jig that mounts said honeycomb molded body thereon on said table or said conveyor;

a firing furnace used for firing the honeycomb molded body mounted on the firing jig;

a firing jig disassembling apparatus which includes a robot arm, and a table or a conveyor for placing thereon a firing jig to which a lid member is attached, with a honeycomb molded body being mounted on said firing jig upon firing the honeycomb molded body, said lid member attached to said firing jig being detached on said table or said conveyor; and a transporting conveyor that transports by machines at least either one of the lid member that is detached in said firing jig disassembling apparatus and the firing jig from the firing jig disassembling apparatus to said firing jig assembling apparatus, said firing jig assembling apparatus comprising:

a lid member attaching mechanism that attaches said lid member by using said robot arm to a predetermined position of said firing jig placed on said table or said conveyor; and a jig delivering mechanism that delivers the firing jig which has said honeycomb molded body being mounted thereon and the lid member being attached thereto, to said firing furnace, said firing jig disassembling apparatus comprising:

a jig receiving mechanism that receives the firing jig which has said fired honeycomb molded body being mounted thereon with the lid member being attached thereto, from said firing furnace; and a lid member detaching mechanism that detaches said lid member by using said robot arm from the firing jig placed on said table or said conveyor with the lid member being attached thereto.

21. The method for manufacturing a honeycomb structure according to claim 20, wherein said firing jig assembling apparatus further comprises a jig piling mechanism that piles up a plurality of firing jigs, each having said honeycomb molded body mounted thereon, in multiple stages, and said firing jig disassembling apparatus further comprises a jig taking-out mechanism that takes out a firing jig from said firing jigs piled up in multiple stages.

22. The method for manufacturing a honeycomb structure according to claim 20, wherein said bottom member is usable as a degreasing jig.

23. The method for manufacturing a honeycomb structure according to claim 20, wherein said firing jig assembling apparatus and/or said firing jig disassembling apparatus comprise said conveyor that moves intermittently, and upon stopping of said conveyor, said conveyor shifts from a moving state at a moving speed of about 1.5 m/min or less to a stopped state.

24. The method for manufacturing a honeycomb structured body according to claim 20, wherein at least one of said robot arms has a grasping portion, and a groove portion is formed on a bottom face of said bottom member in such a shape that one portion of said grasping portion is fitted to said groove portion.

25. The method for manufacturing a honeycomb structured body according to claim 20, wherein said robot arm of said firing jig assembling apparatus moves said bottom member and/or said sidewall member, and attaches said sidewall member to said bottom member.

26. The method for manufacturing a honeycomb structured body according to claim 20, wherein said robot arm of said firing jig disassembling apparatus detaches said sidewall member from said firing jig, and moves said sidewall member and/or said bottom member from which said sidewall is detached.

27. The method for manufacturing a honeycomb structured body according to claim 20, wherein said firing jig assembling apparatus includes said table, said firing jig disassembling apparatus includes said table, and said table of said firing jig assembling apparatus and/or said table of said firing jig disassembling apparatus is a rotation table or a table allowed to move through rails.

28. The method for manufacturing a honeycomb structured body according to claim 20, wherein said robot arm of said firing jig assembling apparatus and said robot arm of said firing jig disassembling apparatus each have has a grasping mechanism and/or a suction mechanism.

29. The method for manufacturing a honeycomb structured body according to claim 28, wherein said robot arm of said firing jig assembling apparatus moves said lid member, and/or attaches said lid member to said firing jig with said honeycomb molded body being mounted on said firing jig.

30. The method for manufacturing a honeycomb structured body according to claim 28, wherein said robot arm of said firing jig disassembling apparatus moves said lid member, and/or detaches said lid member attached to said firing jig with said fired honeycomb molded body being mounted on said firing jig.

31. The method for manufacturing a honeycomb structured body according to claim 28, wherein said robot arm of said firing jig disassembling apparatus simultaneously grasps and/or suction-holds a plurality of said fired honeycomb molded bodies.

32. The method for manufacturing a honeycomb structured body according to claim 20, wherein said firing furnace is a continuous furnace.

33. The method for manufacturing a honeycomb structured body according to claim 20, wherein said circulating apparatus comprises three transporting conveyors, and said three transporting conveyors transport said lid member, said sidewall member, and said bottom member separately.

34. The method for manufacturing a honeycomb structured body according to claim 20, wherein said circulating apparatus comprises two transporting conveyors, one of said two transporting conveyors transports two of three members consisting of said lid member, said sidewall member, and said bottom member, and the other of said two transporting conveyors transports the rest of the three members.

35. The method for manufacturing a honeycomb structured body according to claim 20, wherein said circulating apparatus comprises one transporting conveyor, and said one transporting conveyor transports said lid member, said sidewall member, and said bottom member.

36. The method for manufacturing a honeycomb structured body according to claim 20, wherein said circulating apparatus has a structure that at least one of three members consisting of said lid member, said sidewall member, and said bottom member, is circulated by said transporting conveyor, while the rest of the three members are stored.

37. The method for manufacturing a honeycomb structured body according to claim 20, wherein said circulating apparatus has a structure that said firing jig with said sidewall member being attached to said bottom member is circulated by said transporting conveyor.

38. The method for manufacturing a honeycomb structured body according to claim 20, wherein firing is carried out such that said honeycomb molded body is mounted on said firing jig, and said firing jigs are in a piled state in multiple stages.

39. The method for manufacturing a honeycomb structured body according to claim 20, wherein said honeycomb structured body is comprised of a plurality of said fired honeycomb molded bodies bound to one another by interposing sealing material layers.

40. The method for manufacturing a honeycomb structured body according to claim 20, wherein said honeycomb structured body is comprised of said single fired honeycomb molded body.

* * * * *

UNITED STATES PATENT AND TRADEMARK OFFICE

CERTIFICATE OF CORRECTION

PATENT NO. : 7,687,013 B2
APPLICATION NO. : 11/927046
DATED : March 30, 2010
INVENTOR(S) : Tsuyoshi Kawai, Takamitsu Saijo and Kenichiro Kasai It is certified that error appears in the above-identified patent and that said Letters Patent is hereby corrected as shown below:

Column 36, Line 19, the line should read as follows:
each have a grasping mechanism and/or a suction Column 39, Line 6, the line should read as follows:
each have a grasping mechanism and/or a suction Signed and Sealed this
Eighth Day of March, 2011

David J. Kappos
*Director of the United States Patent and Trademark Office*